United States Patent [19]

Kohama et al.

[11] Patent Number: 4,532,798

[45] Date of Patent: Aug. 6, 1985

[54] MEASUREMENT OF VARIATIONS IN INTERNAL COMBUSTION ENGINE OUTPUT

[75] Inventors: Tokio Kohama, Nishio; Hideki Obayashi, Okazaki; Hisasi Kawai, Toyohashi; Toshikazu Ina, Aichi; Takashi Shigematsu; Setsuo Tokoro, both of Susono, all of Japan

[73] Assignees: Nippon Soken, Inc., Nishio; Toyota Jidosha Kabushiki Kaisha, Toyota, both of Japan

[21] Appl. No.: 615,910

[22] Filed: May 31, 1984

[30] Foreign Application Priority Data

Jun. 8, 1983 [JP] Japan .................................. 58-100965
Jun. 16, 1983 [JP] Japan .................................. 58-106699
Jun. 16, 1983 [JP] Japan .................................. 58-106700

[51] Int. Cl.³ .......................................... G01M 15/00
[52] U.S. Cl. ........................................................ 73/116
[58] Field of Search ............... 73/116, 117.3; 364/551; 123/419; 324/160

[56] References Cited

U.S. PATENT DOCUMENTS 3,623,459 11/1971 Gordon .
4,130,095 12/1978 Bowler et al. .
4,270,503 10/1979 Pomerantz .
4,398,259 8/1983 Levine ................................. 364/551
4,428,342 1/1984 Suzuki et al. ....................... 123/419
4,456,963 6/1984 Wiggins ............................. 73/117.3
4,492,102 1/1985 Van Zanten ......................... 73/116

FOREIGN PATENT DOCUMENTS 57-70954 5/1982 Japan .
57-106834 7/1982 Japan .

OTHER PUBLICATIONS

"Control of Exhaust Pollution Through a Mixture-Optimizer," Automotive Engineering Congress, Jan. 10-14, 1972, SAE 720254.

Primary Examiner—Stephen A. Kreitman
Attorney, Agent, or Firm—Cushman, Darby & Cushman

[57] ABSTRACT

In a method for measuring variations in the output of an internal combustion engine, at least one of signals respectively representing an engine speed, torque, and internal cylinder pressure of the internal combustion engine during the firing strokes of the engine is obtained. A periodical and pulsating change in the obtained signal is detected. A differential value at a portion of the change of the signal having a maximum gradient is then detected. Another method provides measuring variations in the output of the internal combustion engine by calculating the difference between the maximum and minimum values of the change of the obtained signal. Still another method provides measuring variations in the output of the internal combustion engine by correcting the obtained value in accordance with the engine speed. Still another method provides measuring variations in the output of the internal combustion engine by calculating the difference between consecutive changes.

14 Claims, 31 Drawing Figures

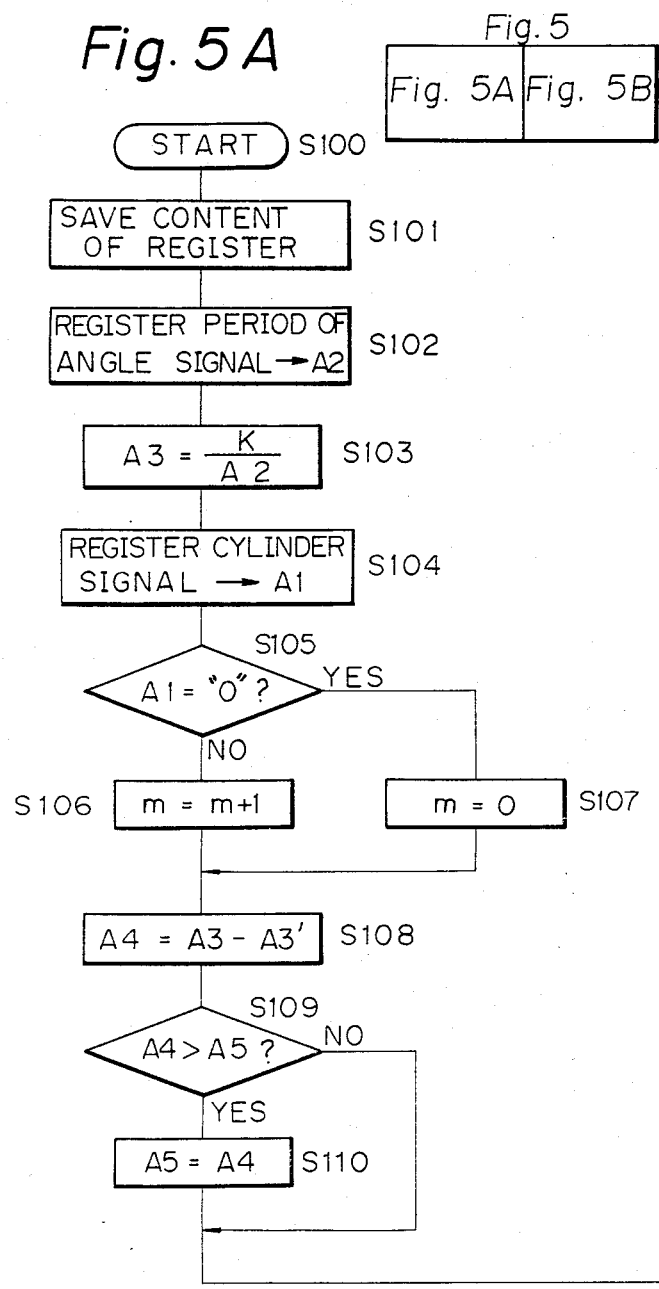

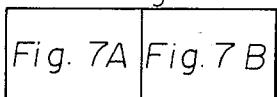
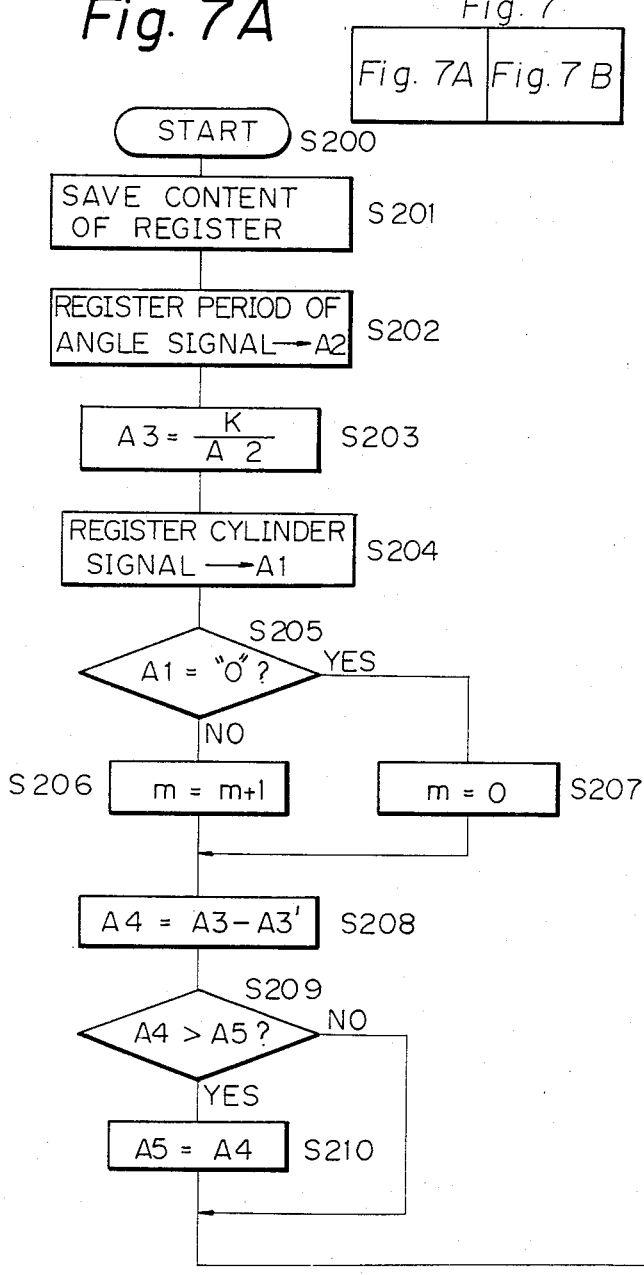
Fig. 7A

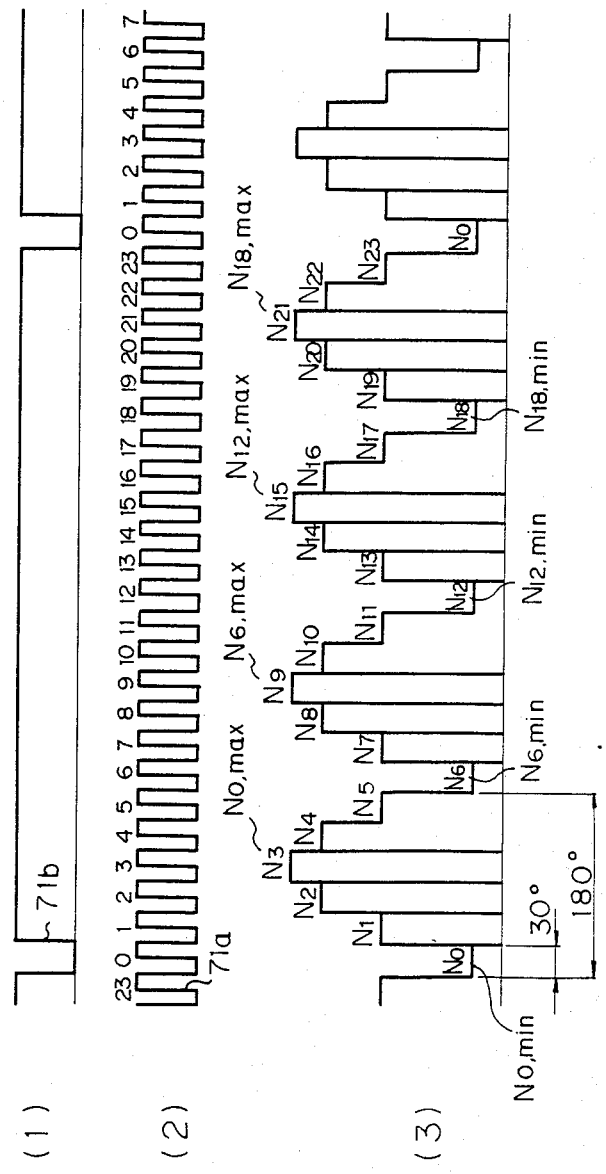

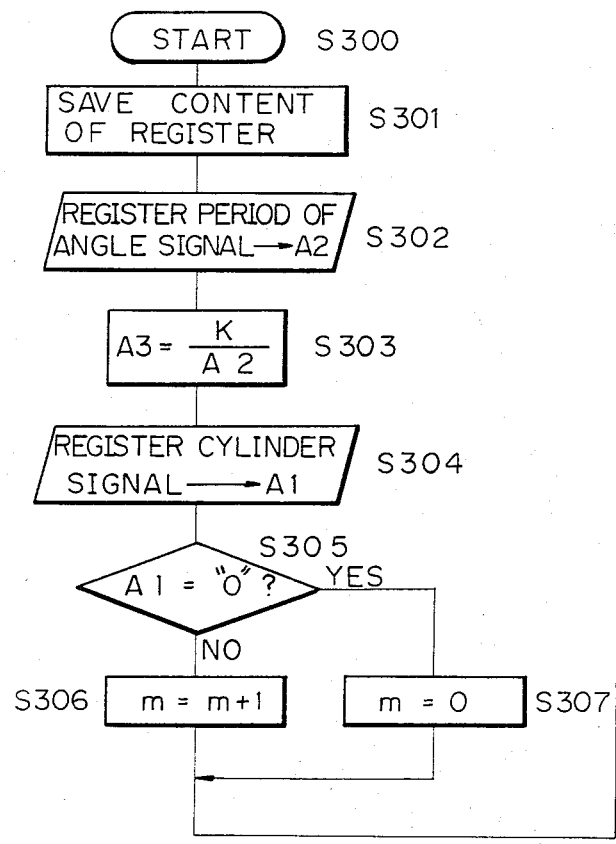

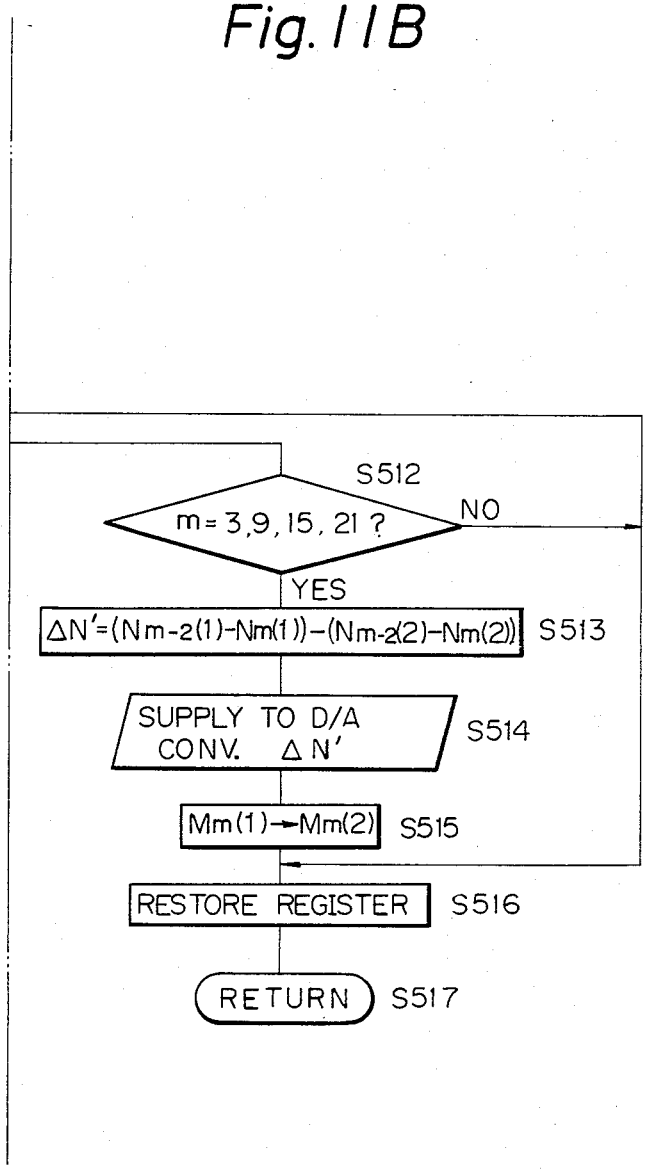

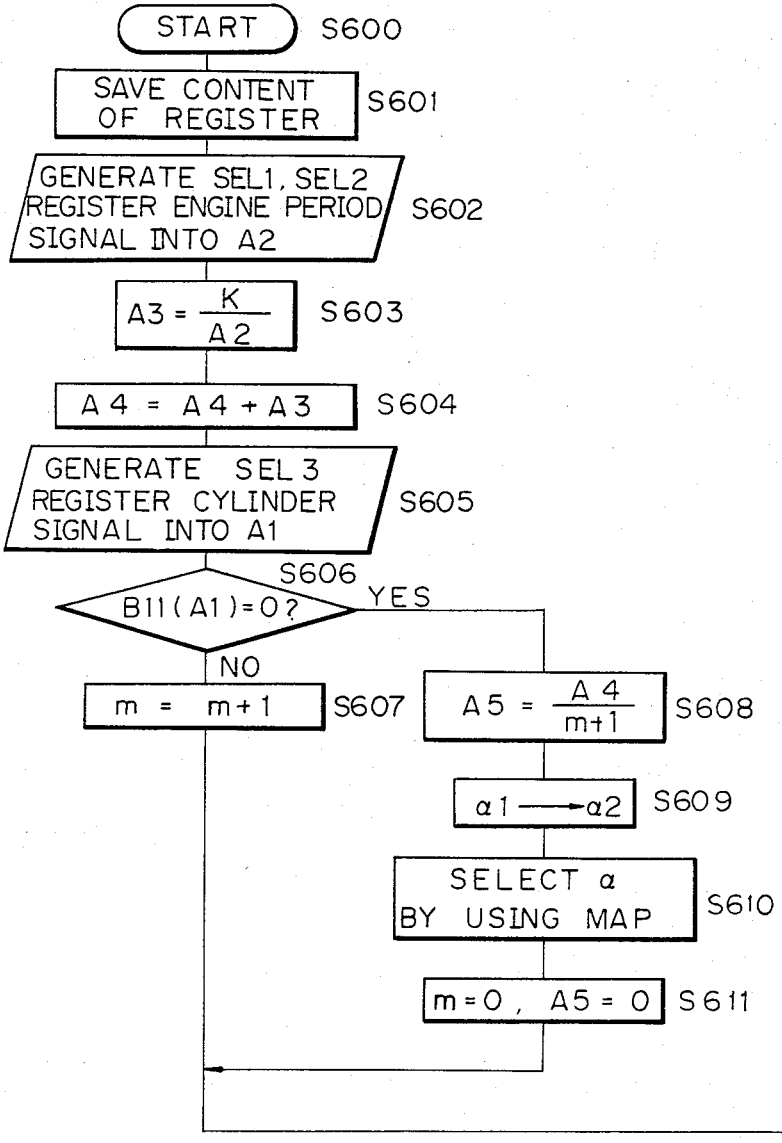

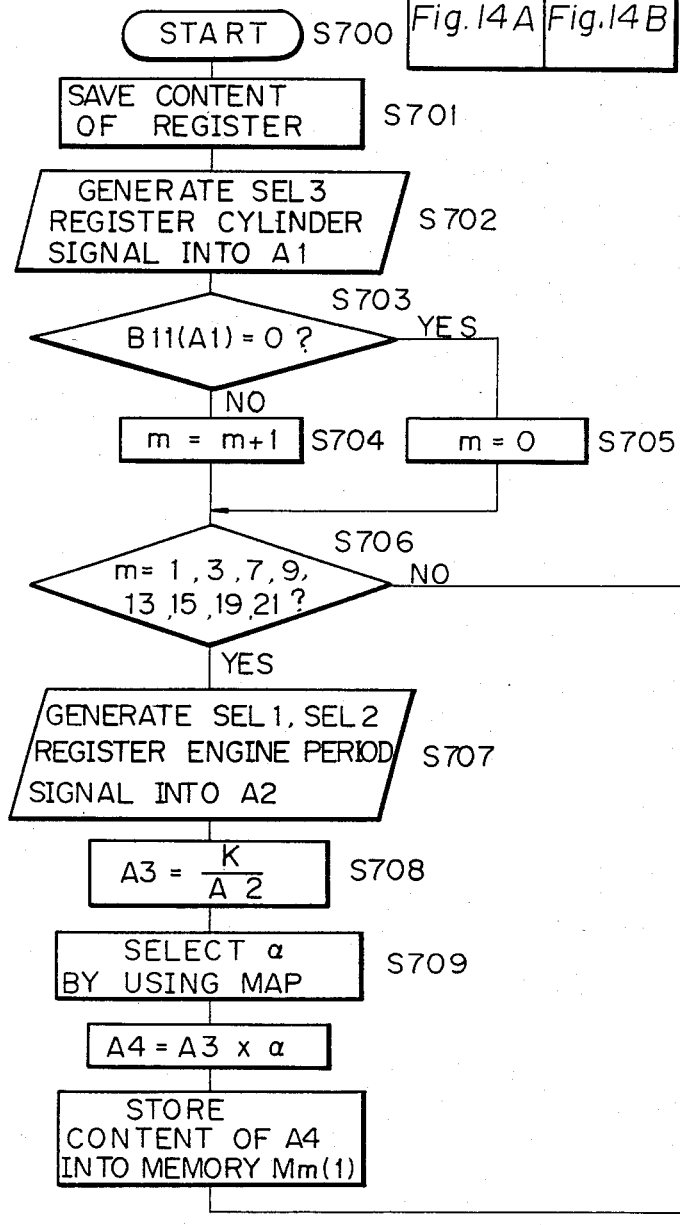

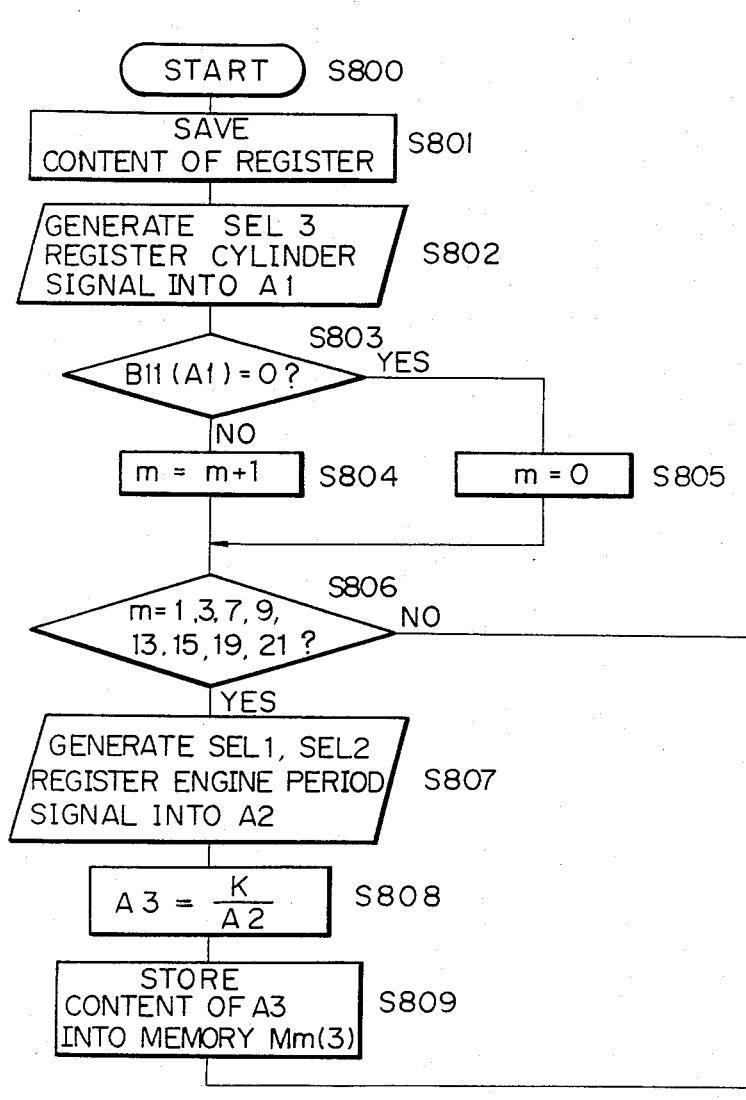

MEASUREMENT OF VARIATIONS IN INTERNAL COMBUSTION ENGINE OUTPUT

BACKGROUND OF THE INVENTION

1. Field of the Invention

The present invention relates to a method for measuring variations in the output of an internal combustion engine.

2. Description of the Prior Art

Recent measures taken against exhaust gas pollution and to conserve energy include attempts to achieve an optimal ignition timing and air/fuel ratio of an engine, and a common method of controlling the ignition timing or air/fuel ratio is by measuring variations in the output of an engine.

Conventional methods of measuring variations in the output of an engine are disclosed, for example, in Japanese Unexamined Patent Publication (Kokai) Nos. 51-104106, 53-65531, and 57-106834. In all of these methods, a time Ti required for the crankshaft to rotate once is time-serially measured. The mean number of revolutions of the crankshaft, that is, the mean engine speed, is sequentially compared with a reference or optimal value upon each rotation of the crankshaft, to determine the variations in the output of an engine.

For example, assume that a vehicle mounting a 4-stroke-cycle 4-cylinder engine travels at a constant speed at an air/fuel ratio (A/F) of 14.5 under different road conditions, and the waveforms of the engine speed signals measured at crankshaft angular (CA) intervals of 30° obtained in the case of travel on a smooth surface are compared with those obtained in the case of travel on a rough road. When such a comparison is made, although the vehicle is traveling at a constant speed in both cases, the engine speed fluctuates greatly in accordance with the road conditions. It is seen from this comparison that the mean engine speed is largely influenced not only by variations in the output of the engine but also by load fluctuations on the engine. Accordingly, it is difficult to measure variations in the output of an engine precisely by these conventional methods, which measure variations in crankshaft rotation or in the output of an engine in accordance with the engine speed measured upon each rotation of the crankshaft.

SUMMARY OF THE INVENTION

The main object of the present invention is to provide an improved method of measuring variations in the output of an internal combustion engine, which method is capable of precisely measuring variations in the output in accordance with changes in the engine speed, or torque or internal cylinder pressure, which depend almost entirely on variations in the output of the engine and are therefore indices thereof.

According to a first aspect of the present invention, there is provided a method for measuring variations in the output of an internal combustion engine comprising the steps of obtaining at least one of the signals representing the engine rotational speed, engine torque, and internal cylinder pressure during the firing strokes of the engine; detecting periodical or pulsating changes in the obtained signal; and calculating a differential value of the change in the obtained signal at the portion where the gradient of the change is maximum.

According to a second aspect of the present invention, there is provided a method for measuring variations in the output of an internal combustion engine comprising the steps of obtaining at least one of the signals representing the engine rotational speed, engine torque, and internal cylinder pressure during the firing strokes of the engine; detecting periodical or pulsating changes in the obtained signal; and calculating a difference between the maximum and minimum values of the change in the obtained signal, whereby the calculated difference is treated as a value corresponding to the state of combustion in the engine.

According to a third aspect of the present invention, there is provided a method for measuring variations in the output of an internal combustion engine comprising a step of detecting a value corresponding to the state of combustion of the engine by detecting periodical and pulsating changes in at least one of the signals representing the engine rotational speed, engine torque and internal cylinder pressure during the firing strokes of the engine, wherein the detected value is a value corrected by the engine rotational speed.

According to a fourth aspect of the present invention, there is provided a method for measuring variations in the output of an internal combustion engine comprising the steps of detecting periodical and pulsating changes in at least one of the signals representing the engine rotational speed, engine torque, and internal cylinder pressure during the firing strokes of the engine, calculating the difference of changes in at least one of the engine rotational speed, the engine torque and internal cylinder pressure conditions within predetermined periods of consecutive firing strokes of a predetermined cylinder, and calculating the difference of the calculated consecutive difference of changes by using the calculated difference of changes.

BRIEF DESCRIPTION OF THE DRAWINGS

FIGS. 5A and 5B are a flow chart showing the calculation flow sequence in the apparatus shown in FIG. 4;

FIGS. 7A and 7B are a flow chart showing the calculation flow sequence in another embodiment corresponding to the first aspect of the present invention;

FIG. 8 is charts explaining the operation according to a second aspect of the present invention;

FIGS. 9A, 9B, and 10 are flow charts showing the flow sequence according to the second aspect of the present invention;

FIGS. 11A and 11B are a flow chart showing the calculation flow sequence according to a third aspect of the present invention;

FIGS. 13A, 13B, 14A, and 14B are flow charts showing other calculation flow sequences according to the third aspect of the present invention;

FIGS. 18A and 18B are a flow chart showing the calculation flow sequence according to the fourth aspect of the present invention;

DETAILED DESCRIPTION OF THE PREFERRED EMBODIMENTS

Figure 1:
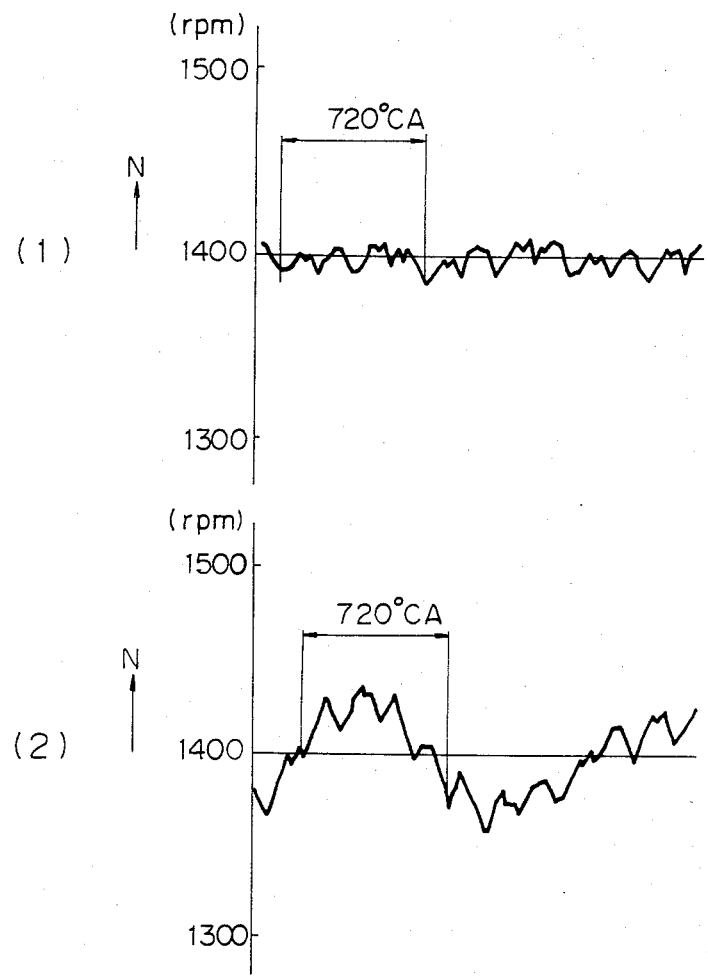
FIG. 1 is charts showing the signal waveform of the engine speed of an internal combustion engine corresponding to different road conditions.

A first aspect of an embodiment of the present invention is based on the following finding by the present inventors. FIG. 1 shows the waveforms of the engine speed measured at crankshaft angular (CA) intervals of 30° when a vehicle mounting a 4-stroke-cycle 4-cylinder engine travels at a constant speed with an air/fuel ratio (A/F) of 14.5. FIG. 1,(1) corresponds to the case of travel on a smooth surface, while FIG. 1, (2) represents the case of travel on a rough road. As can be seen from FIG. 1, although the vehicle travels at the same speed in both cases, the engine speed fluctuates in accordance with the condition of the road. That is, the mean engine speed measured upon each rotation of the crankshaft is greatly influenced not only by variations in the output of the engine but also by fluctuations in the load of the engine due to the rough surface of the road. Therefore, it is clear that the conventional methods of measuring variations in crankshaft rotation or in the output in accordance with the engine speed measured per rotation of the crankshaft do not allow accurate detection of variations in the output of the engine.

Figure 2A:
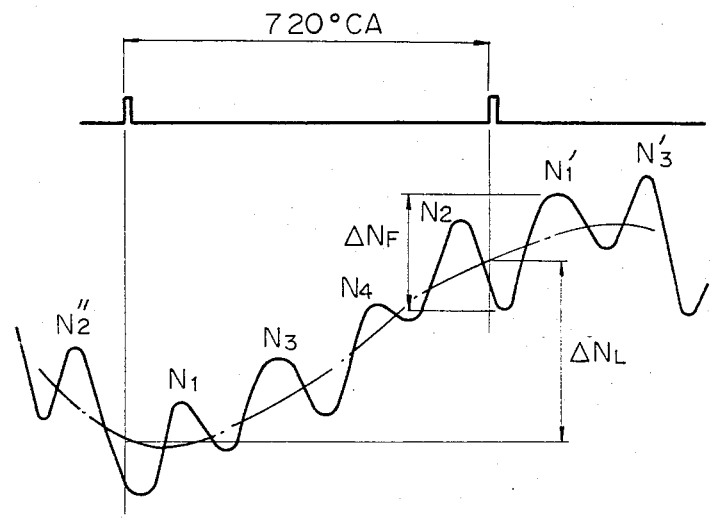
FIGS. 2A to 2D are charts and graphs explaining the principle of the present invention.

FIG. 2A is an enlarged graph showing changes in the engine speed over a period of time when the vehicle is traveling on a rough road. The firing order of the cylinders is first, third, fourth, and second. In FIG. 2A, reference symbols $N_1$ and $N_1'$ represent the engine speed during the firing stroke of the first cylinder, and reference symbols $N_2$, $N_2''$, $N_3$, $N_3'$, and $N_4$, respectively, represent the engine speed in the firing strokes of the second, third and fourth cylinders, respectively. 720° CA in FIG. 2A corresponds to one cycle. As can be seen from FIG. 2A, when changes in the engine speed are observed microscopically, pulselike, short-period changes in the engine speed occurring during the firing stroke of each cylinder are superimposed on relatively long period changes in the engine speed due to road conditions, e.g., rough road surface, that is, changes in the load torque.

Engine speed change $\Delta N_L$ occurs in accordance with variations in the road conditions, that is, the roughness or smoothness of the road surface, and engine speed change $\Delta N_F$ occurs in accordance with variations in the combustion condition of the engine.

If the engine speed change $\Delta N_L$ is kept constant, the combustion condition of the engine can be detected in accordance with the pulse-like, relatively short-period engine speed change $\Delta N_F$ during the firing stroke of each cylinder.

When the changes $\Delta N_F$ and $\Delta N_L$ are compared, the change $\Delta N_F$ is abrupt and is greater in magnitude than the change $\Delta N_L$. This indicates that the influence of the change $\Delta N_L$ on the change $\Delta N_F$, corresponding to the combustion condition, is small. In particular, at the change $\Delta N_F$ corresponding to an engine speed curve portion having the maximum gradient, the influence of the change $\Delta N_L$ is at a minimum. This means that the change $\Delta N_F$ corresponding to the maximum gradient has an optimum correlation with the combustion condition.

As mentioned previously, the first aspect of the present invention is based on the above-described findings. Thus, according to an embodiment for achieving this first aspect of the present invention, the pulselike increases in the engine speed during the firing stroke are differentiated. The maximum differential value obtained is detected as a value which corresponds to the combustion condition. The maximum differential value for each cylinder is then statistically processed to obtain the variations in the combustion condition. In another embodiment corresponding to the first aspect of the present invention, variations in the combustion condition are calculated in accordance with the difference between the sequential differential values corresponding to a predetermined cylinder.

Figure 2B:
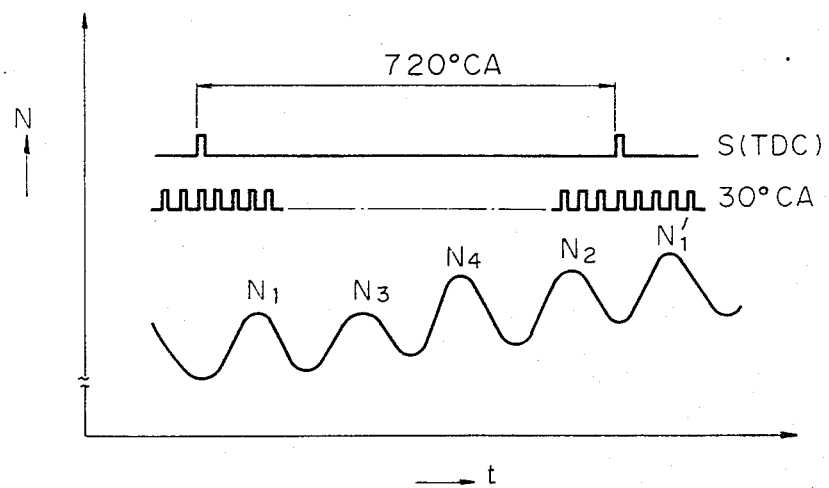

A second aspect of the present invention is similarly based on the findings of the present inventors, as described below. FIG. 2B shows changes in the engine speed of a 4-stroke-cycle 4-cylinder engine over a period of time. The firing order of the cylinders is again first, third, fourth, and second. In FIG. 2B, reference symbols $N_1$ and $N_1'$ represent the engine speed during the firing stroke of the first cylinder, and reference symbols $N_2$, $N_3$, and $N_4$, respectively, represent the engine speed in the firing strokes of the second, third, and fourth cylinders, respectively. Reference symbol S(TDC) represents a top dead center signal.

When changes in the engine speed are observed microscopically, such changes include those due to operation of the acceleration pedal, relatively long-period changes in engine speed due to loading fluctuations, or pulselike, short-period changes in engine speed occurring during the firing stroke of each cylinder. Similar pulse-like changes are also observed in the engine torque and internal cylinder pressure.

The pulse-like changes in the engine speed occurring in the respective explosion strokes shown in FIG. 2B can be easily calculated as the difference between the maximum and minimum values of the engine speed during the firing stroke of a predetermined cylinder.

Figure 2C:
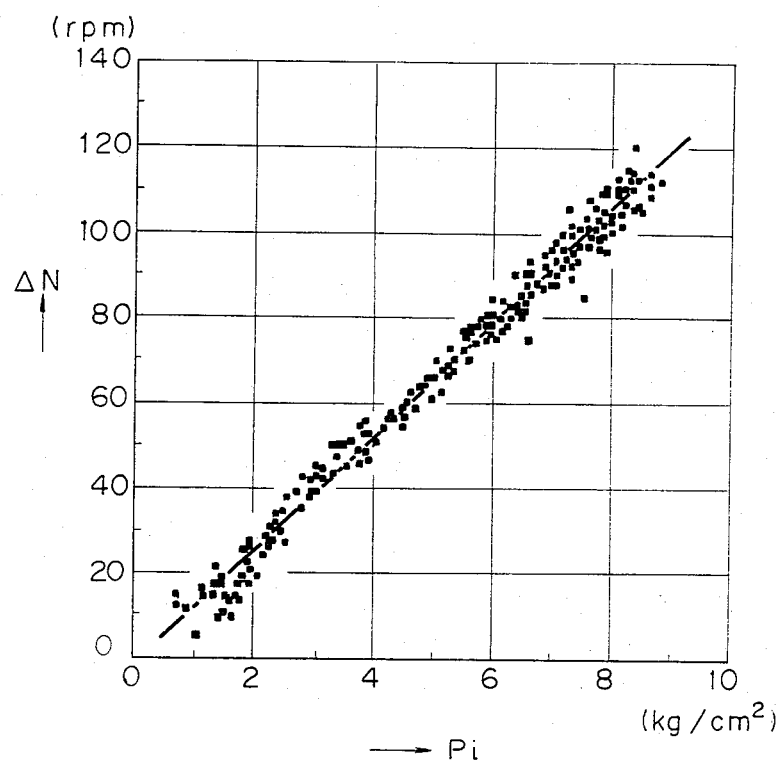

FIG. 2C shows the pulse-like change $\Delta N$ (rmp) calculated as the difference between the maximum and minimum values of the engine speed during each firing stroke as a function of the mean effective pressure Pi ($kg/cm^2$). As can be seen from FIG. 2C, the output of the engine can be detected with satisfactory precision in accordance with the pulse-like change in the engine speed occurring during each firing stroke.

Changes in the engine speed during each firing stroke are measured within very short time periods. Conversely, changes in the engine speed caused by changes in the load of the engine, which occur due to the rough surface of the road, are slow. Therefore, the pulse-like changes in the engine speed measured during each firing stroke are little influenced by the road conditions.

Figure 2D:
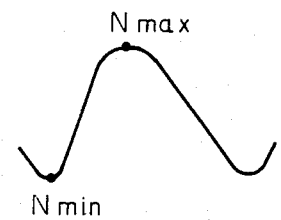

The second aspect of the present invention is based on the above findings. According to the embodiment corresponding to the second aspect of the present invention, the pulse-like change in the engine speed during each firing stroke is detected in accordance with the difference between the maximum and minimum values of the engine speed during the firing stroke, and the detected changes for the sequential firing strokes of a predetermined cylinder are compared with each other (FIG. 2D). According to this aspect of the present invention, variations in the output of an internal combustion engine can be detected with a high precision and without being adversely affected by variations in the road conditions. In particular, the pulse-like change in the engine speed detected in accordance with the maximum and minimum values of the engine speed is correlated with the engine output. Therefore, the differences obtained by comparing the sequential pulse-like changes for the predetermined cylinder are correlated with the output variations.

Figure 3:
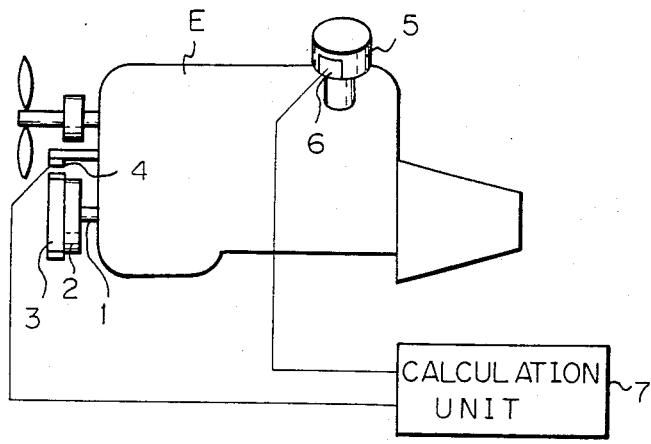
FIG. 3 is a schematic view of an apparatus utilizing a method of measuring variations in the output of an internal combustion engine according to an embodiment corresponding to a first aspect of the present invention.

FIG. 3 shows an apparatus utilizing a method of measuring variations in the output of an internal combustion engine according to an embodiment corresponding to the first aspect of the present invention. Referring to FIG. 3, reference symbol E denotes a 4-stroke-cycle 4-cylinder engine. An angle signal encoder 3 is mounted on a pulley 2 located at the distal end of a crankshaft 1 of the engine E. The angle signal encoder 3 is a magnetic disk and has 36 teeth on its outer periphery. An angle signal sensor 4 is mounted in a position opposed to the teeth of the encoder 3. The sensor 4 produces a pulse signal every time a tooth of the encoder 3 passes the sensor 4. Thus, the sensor 4 produces a signal consisting of 36 pulses for each revolution of the crankshaft 1. The crankshaft 1 rotates twice during the period in which the first to fourth cylinders complete the firing strokes sequence.

Reference numeral 5 denotes a distributor and 6 a cylinder sensor incorporated in the distributor 5. The cylinder sensor 6 produces a pulse signal at a time corresponding to the top dead center position of the first cylinder. A calculation unit 7 receives the pulse signals from the angle signal sensor 4 and the cylinder sensor 6, and calculates variations in the output of the engine E.

Figure 4:
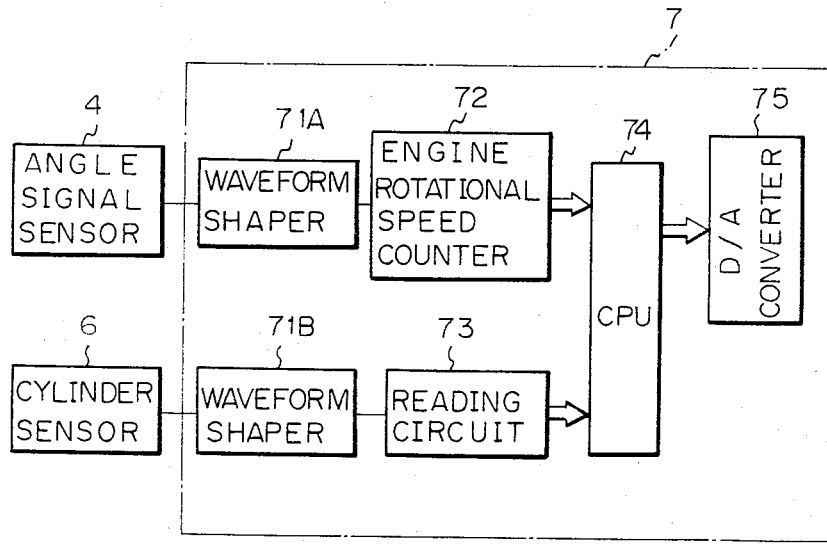
FIG. 4 is a block diagram of the configuration of an output variation calculating unit in the apparatus shown in FIG. 3.

FIG. 4 shows the configuration of the calculation unit 7 in the apparatus shown in FIG. 3. An angle signal from the angle signal sensor 4 is shaped by a waveform shaper 71A and is supplied to an engine rotational speed counter circuit 72. The counter circuit 72 comprises a 16-bit binary counter which counts the angle signal for a period of 10° CA, and supplies the binary data to a CPU 74. The CPU 74 calculates the inverse number of the input value, to calculate the engine speed. A cylinder signal from the cylinder sensor 6 is shaped by a waveform shaper 71B and is supplied to the CPU 74 through a reading circuit 73. Any change in the engine speed or engine torque calculated by the CPU 74 is converted into an analog signal by a digital/analog (D/A) converter 75 and is supplied to an air/fuel ratio control device or an ignition timing control device (not shown).

Figure 5B:
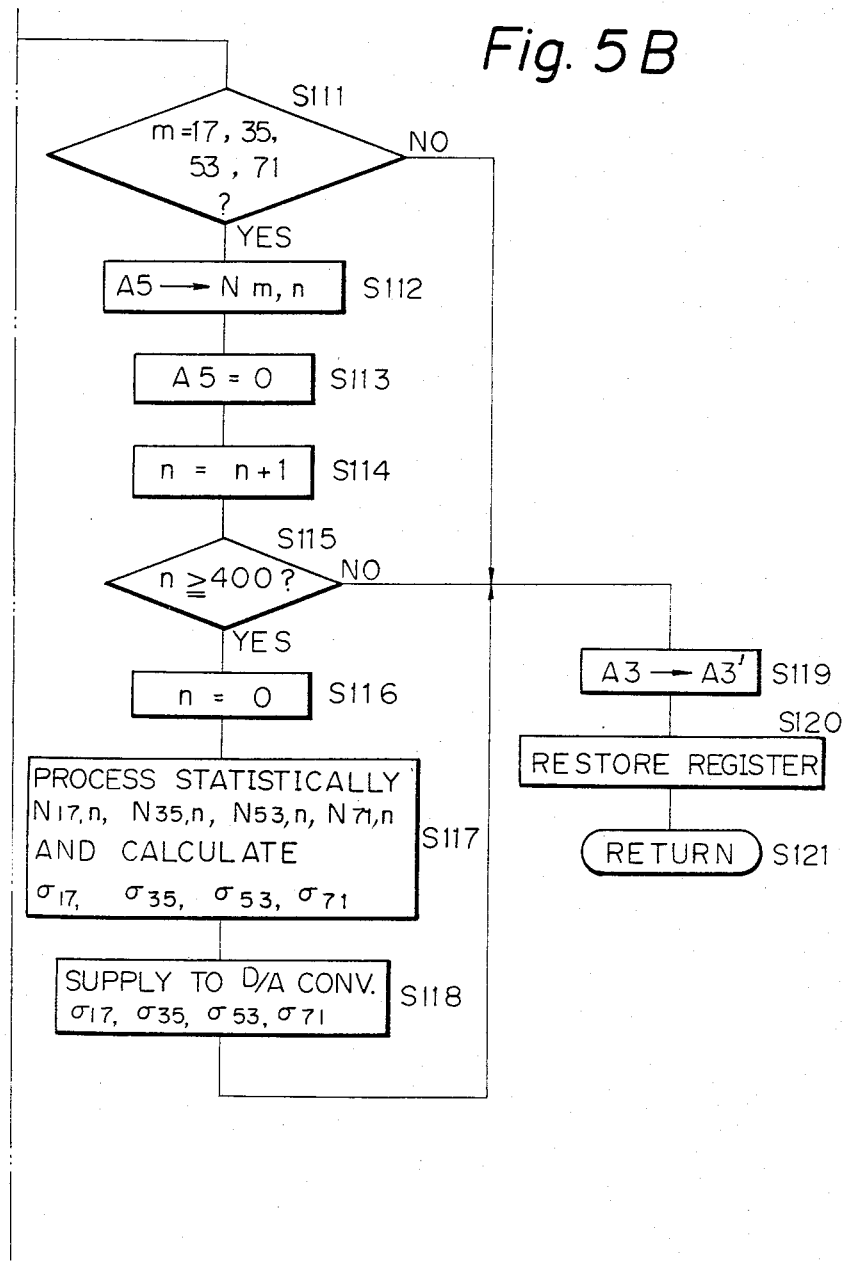

In the apparatus shown in FIGS. 1–4, the calculation by the CPU 74 is performed in accordance with the flow sequence shown in FIG. 5. According to the program shown in FIG. 5, an interrupt signal is supplied to the CPU 74 at the trailing edge of each of 36 pulses of the signal from the angle signal sensor 4, and the program for calculating changes in the engine speed, the sequence of which is as shown in FIG. 5, is started.

Referring to FIG. 5, in step S101, the contents of the registers before interruption are saved in a memory. In step S102, the period of the angle signal counted by the counter circuit 72 is registered into a register A2. In step S103, the inverse number of the period is calculated in accordance with the following equation:

$$A3 = K/A2 \qquad (1)$$

and the calculated value is stored as engine speed data in a register A3.

In step S104, the level of the cylinder signal is registered into a register A1. In step S105, it is determined whether or not the content of the register A1 is "0". If the result is YES in step S105, a cylinder counter m is cleared to 0 in step S107. However, if the result is NO in step S105, the counter m is incremented by one in step S106.

In the apparatus shown in FIG. 4, the angle signal encoder 3 produces 36 pulses per one revolution of the engine. Therefore, the counter m counts from 1 to 36 pulses upon one revolution of the engine and from 1 to 72 pulses upon two revolutions of the engine. Since the cylinder signal corresponds to the top dead center position of the first cylinder, the first to 17th pulses correspond to the first cylinder, the 18th to 35th pulses correspond to the third cylinder, the 36th to 53rd pulses correspond to the fourth cylinder, and the 54th to 71st pulses correspond to the second cylinder.

Figure 6:
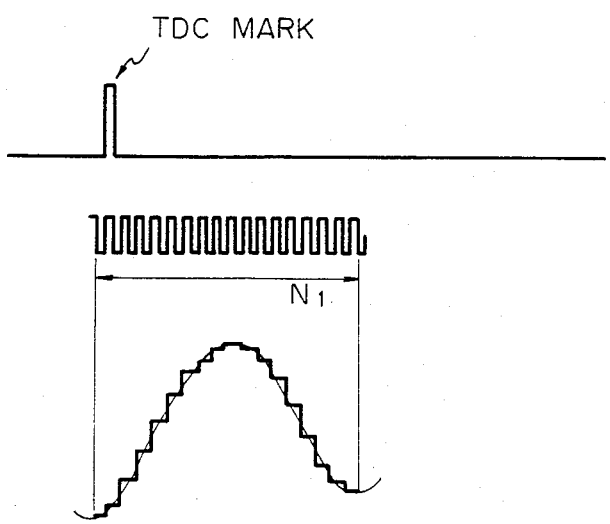
FIG. 6 is a chart showing the engine speed calculation result obtained for a given cylinder.

FIG. 6 shows the engine speed calculation result obtained for the first cylinder ($N_1$) As seen from FIG. 6, 18 bits of engine speed data are obtained for $N_1$.

Referring again to FIG. 5, in step S108 a difference is calculated according to the following equation $$A4 = A3 - A3' \qquad (2)$$

between an engine speed stored in a register A3' obtained by the previous calculation and a current engine speed stored in the register A3 (i.e., between the sequentially calculated engine speeds at timings separated by 10° CA in FIG. 6). Thus, the differential value of the pulselike engine speed in the firing stroke, that is, the gradient of the engine speed in the firing stroke, is calculated. The calculated result is stored in a register A4.

In step S109, it is determined whether the differential value in the register A4 is larger than a maximum value of this firing stroke stored in a register A5. If the result is YES in step S109, the content of the maximum value stored in the register A5 is set in the register A4 in step S110. However, if the result is NO in step S109, the flow jumps to step S111.

In step S111, it is determined whether the count of the counter m coincides with any one of values 17, 35, 53, and 71. If the result is YES in step S111, a calculation is performed in step S112 and subsequent steps. If the result is NO in step S111, the flow jumps to step S119. As previously described, the values 17, 35, 53, and 71 compared with the current detected engine speed in step S111 correspond to the end points of the firing strokes of the first, third, fourth, and second cylinders, respectively.

In step S112, the gradient, i.e., the maximum differential value stored in the register A5, is stored in a memory $N_{m,n}$ as a preparation for the statistical calculation in step S117. In step S113, the register A5 is cleared to 0. For subsequent calculation of the maximum value, a data sample counter n is incremented by one in step S114.

Since the data sample number is 400 for a 4-cylinder engine, it is determined in step S115 whether the count of the counter n is equal to or greater than 400 (i.e., if the count for each cylinder is 100). If the result is NO in step S115, the flow jumps to step S119. However, if the result is YES in step S115, the calculations in step S116 and subsequent steps are carried out.

In step S116, the counter n is cleared to 0. For the next data sample, the statistical processing for each of the cylinders is performed for 400 sampled data, in step S117. In other words, data $N_{17,n}$, $N_{35,n}$, $N_{53,n}$, and $N_{71,n}$ are calculated for the first, third, fourth, and second cylinders, and standard deviations $\sigma_{17}$, $\sigma_{35}$, $\sigma_{53}$, and $\sigma_{81}$ for the respective cylinders are calculated. In step S118, the calculated results are supplied to the D/A converter 75.

In step S119, the current engine speed data is stored in the register A3' ready for calculation in step S108 in the next flow sequence. In step S120, the registers are restored to the state before the interruption occurred, and the flow sequence ends.

Upon finishing the above calculation, in the apparatus of FIG. 4, the pulse-like increase in engine speed in the firing stroke is differentiated, i.e., the gradient of the engine speed slope per 10° CA is calculated. The maximum value of such differential values is detected and indicates the combustion condition. The differential values for a predetermined cylinder are statistically processed to determine variations in the combustion condition.

In the flow chart shown in FIG. 5, the engine speed is calculated for each 10° CA, and the engine speed data is obtained. However, the engine speed need not always be measured per 10° CA. According to the experiments conducted by the present inventors, the upper limit of the interval for measuring the engine speed was determined to be about 30° CA. However, it should be understood that the detection interval of the engine speed should be as small as possible to obtain a higher measurement precision.

Figure 7B:
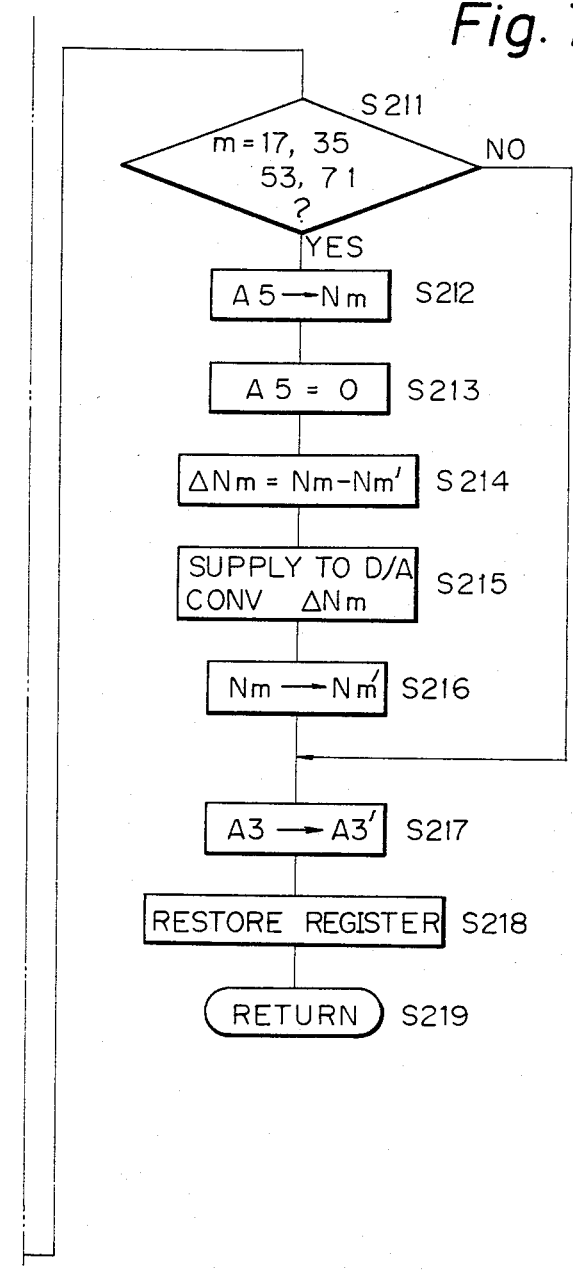

FIG. 7 shows another example of the calculation flow sequence according to another embodiment corresponding to the first aspect of the present invention. According to this embodiment, as in the case of the first embodiment described above, an interruption signal is supplied to the CPU 74 upon detection of the trailing edge of each of the 36 pulses of the signal from the angle signal encoder 4, and the engine speed variation calculation program as shown in FIG. 7 is started. Since steps S201 to S213 in FIG. 7 are the same as equivalent steps in FIG. 5, they will not be described.

In step S214, a variation in the combustion condition is calculated in accordance with the difference between subsequent detected engine speeds corresponding to a predetermined cylinder according to the following equation:

$$\Delta N_m = N_m - N_m' \tag{3}$$

In step S215, the change $\Delta N_m$ is supplied to the D/A converter 75. In step S216, the content of a register $N_m$ is stored in a register $N_m'$ ready for calculation in step S214 in the next flow sequence. In step S217, the content of the register A3 obtained in step S208 of the current flow sequence is stored in a register A3'. In step S218, the contents of the registers are restored to the state before the interruption occurred. Upon completing the above calculation operation, the variation in the combustion condition is determined from the difference between the subsequent detected engine speeds corresponding to a predetermined cylinder, in accordance with the flow chart shown in FIG. 7.

Figure 9B:
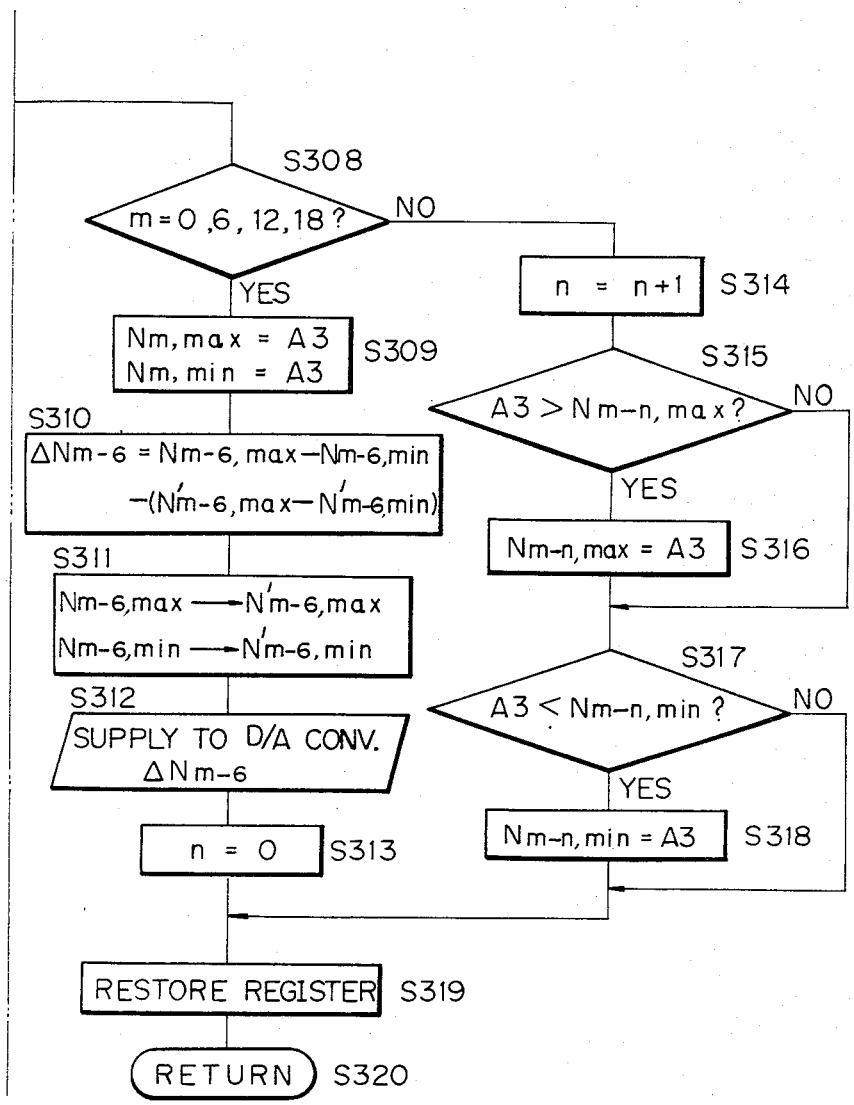

FIGS. 8, (1) to (3) show signal waveforms in accordance with an apparatus utilizing a method of measuring variations in the output of an internal combustion engine, according to an embodiment corresponding to the second aspect of the present invention. FIG. 9 shows the calculation flow sequence according to this embodiment. FIG. 8, (1) shows a cylinder signal 71b. The signal 71b is kept at "0" level during an interval in which the crankshaft 1 is rotated by 30° from the time at which the first cylinder reaches top dead center.

FIG. 8, (2) shows a rotation period signal 71a. Each pulse number of the signal 71a corresponds to each 30° rotation from the time at which the crankshaft 1 reaches top dead center. Thus, the first cylinder corresponds to pulse numbers 0 to 5, and the third, fourth, and second cylinders sequentially correspond to pulse numbers 6 to 23, respectively.

Every time the rotation period signal 71a falls, an interruption signal is supplied to the CPU 74, and the engine speed variation calculation program, as shown in FIG. 9, is started.

In accordance with the flow chart shown in FIG. 9, the contents of the registers before an interruption occurred are saved in a memory, in step S301. In step S302, rotation period data T is read from the counter circuit 72 and registered into a register A2. In step S303, the content of the register A2, that is, the inverse number of the rotation period data T, is multiplied by a suitable proportional coefficient K to calculate the engine speed and the calculated engine speed is stored in a register A3. In step S304, the cylinder signal 71b is registered into a register A1. In step S305, it is determined whether the level of the content stored in the register A1 is "0". If the result is YES in step S305, a count memory m is incremented by one in step 306. If the result is NO in step S305, the memory m is cleared in step S307. In step S308, it is determined whether the count of the memory m coincides with any one of 0, 6, 12, and 18. If the result is YES in step S308, the flow advances to step S309. If the result is NO in step S308, the flow advances to step S314 and subsequent steps.

In step S309, engine speed data in the register A3 is set at an initial value for calculating a maximum value $N_{m,max}$ and a minimum value $N_{m,min}$ of the engine speed in steps S314 to S318. There are four pairs of maximum and minimum values $N_{m,max}$ and $N_{m,min}$ for each of m=0, 6, 12, and 18, and each pair indicates the maximum and minimum values of the engine speed in the combustion cycle of each of the first, third, fourth, and second cylinders.

In step S310, an engine speed change $\Delta N$ is calculated in accordance with the following equation:

$$\Delta N_{m-6} = N_{m-6,max} - N_{m-6,min} - (N'_{m-6,max} - N'_{m-6,min}) \tag{4}$$

When m=6, for example, it corresponds to the start of combustion in the third cylinder. By this time, calculations of maximum and minimum values $N_{0,max}$ and $M_{0,min}$ for the first cylinder, that is, for m−6=0 have been completed. Therefore, the change $\Delta N_0$ is calculated on the basis of the maximum and minimum values $N_{0,max}$ and $N_{0,min}$ of the current cycle and maximum and minimum values $N'_{0,max}$ and $N'_{0,min}$ of the previous cycle. Thus, the engine speed change for the first cylinder can be calculated.

Similarly, when m=12, the change $\Delta N_6$ for the third cylinder is calculated. When m=18, the change $\Delta N_{12}$ for the fourth cylinder is calculated. When m=0, the change $\Delta N_{18}$ for the second cylinder is calculated. When m=0, the change is not represented by $\Delta_{m-6}$ but by $\Delta N_{18}$.

The respective terms $(N_{m-6,max}-N_{m-6,min})$ and $(N'_{m-6,max}-N'_{m-6,min})$ in the above equation (4) respectively correspond to the difference between the maximum and minimum values of the firing strokes of the engine and therefore correspond to the mean effective pressure Pi, as previously described with reference to FIG. 2(C). Therefore, when the difference between the differences between the maximum and minimum values of the engine speed for a predetermined cylinder is calculated in accordance with the above equation (4), the variation in the output of the engine can be calculated. Since the engine speed obtained from the above calculation is measured within an extremely short period of time, the measurement is not affected by variations in the engine speed caused by changes in the load of the engine due to a rough road surface.

Referring again to the flow chart of FIG. 9, in step S311, the current data $N_{m-6,max}$ and $N_{m-6,min}$ are stored as the previous data $N'_{m-6,max}$ and $N'_{m-6,min}$ for the next flow sequence. In step S312, the engine speed change $\Delta N_{m-6}$ of each cylinder calculated in step S310 is supplied to the D/A converter 75.

In step S313, the counter n is cleared. This counter n is incorporated to determine in steps S315 to S318 to which one of 0, 6, 12, and 18 the data $N_{m-6,max}$ and $N_{m-6,min}$ correspond. In step S314, the counter n is incremented by one. In steps S315 and S316, the engine speed data in the register A3 is compared with the data $N_{m-n,max}$ to determine the maximum value. If it is determined in steps S315 and S316 that the value of the data stored in the register A3 is greater than the data $N_{m-n,max}$, the register A3 is updated in step S316.

Similarly, it is determined in steps S317 and S318 whether the value of the data of the A3 is smaller than the value of $N_{n-m,min}$, to determine the minimum value. If it is determined that the current data of the register A3 is smaller than $N_{m-n,min}$, the register A3 is updated in step S318. In step S319, the contents of the registers which were saved before the interruption for the calculation program are restored.

The engine speed variation calculation program is started at each trailing edge of the rotation period signal 71a. The mean engine speeds as shown in FIG. 8,(3) are stored in memories $N_0$ to $N_{23}$. In FIG. 8,(3), the height of each bar represents the magnitude of the mean engine speed, and the corresponding memory storing this engine speed is indicated at the top of each bar.

In the embodiments described with reference to FIGS. 8 and 9, variations in the output of an engine were measured in accordance with changes in the engine speed. However, variations in the output of an engine can also be measured in accordance with changes in an engine torque or an internal cylinder pressure. Furthermore, although the above calculation was performed in accordance with mean measurement data obtained per each 30° rotation of the engine, correlation between the mean engine speed and the combustion condition of the internal combustion engine can also be obtained if the calculation is performed in accordance with the mean engine speed measured at intervals shorter than 30°.

Figure 10:
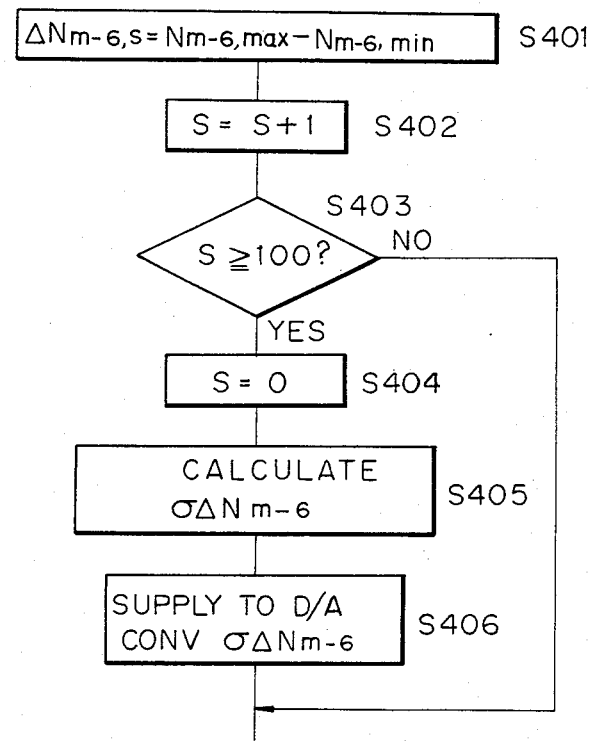

FIG. 10 shows the calculation flow sequence according to another embodiment corresponding to the second aspect of the present invention. In the embodiment described with reference to FIG. 9, as a means for calculating the engine speed change $\Delta N$, the instantaneous value (per combustion cycle) was calculated. However, in the embodiment to be described below, the differences between the maximum and minimum values of engine speed are statistically calculated. The engine speed variations are determined in accordance with the degree of dispersion of the obtained values. The flow chart of the sequence in this embodiment is shown in FIG. 10. The statistic processing is performed by substituting steps S310 to S312 of the flow chart shown in FIG. 9 with steps S401 to S406 in the flow chart shown in FIG. 10.

This flow sequence will now be described. In step S401, the engine speed change $\Delta N$ is calculated in accordance with the following equation:

$$\Delta N_{m-6}=N_{m-6,max}-N_{m-6,min} \qquad (5)$$

The right-hand side of the above equation corresponds to each term of the right-hand side of the former equation (4). Therefore, as can be seen from FIG. 2C, the engine speed change $\Delta N$ and the mean effective pressure Pi have a good correlation. Thus, when the changes $\Delta N$ are statistically processed to calculate the degree of dispersion, the engine speed change, that is, the variation in the output of the engine, can be determined.

In step S402, a data number counter S for counting the number of data of changes $\Delta N$ is incremented by one. In step S403, it is determined whether the count of this counter S is equal to or is greater than 100. If the result is YES in step S403, the flow goes to step S404. However, if the result is NO in step S403, the flow goes to step S313 of the flow chart shown in FIG. 9.

In step S404, the counter S is cleared to 0. In step S405, statistical processing for 100 $\Delta N$ is performed to calculate a standard deviation $\sigma\Delta N_{m-6}$ which indicates the degree of dispersion. The standard deviation $\sigma\Delta N_{m-6}$ is supplied to the D/A converter 75 in step S406. When the above flow sequence ends, step S313 of the flow chart shown in FIG. 9 is executed.

In this embodiment, when the changes $\Delta N$ are statistically processed, the values of the respective cylinders are processed together. However, the changes $\Delta N$ of the respective cylinders can be stored separately and therefore can be processed separately.

An embodiment of a method of measuring variations in the output of an internal combustion engine according to the third aspect of the present invention will now be described with reference to FIGS. 11 to 14. According to this embodiment, when change occurs in at least one of a periodic pulse-like engine speed, an engine torque, and an internal cylinder pressure in each firing stroke of the engine, and is measured to determine a value which indicates a combustion condition, the determined value is corrected in accordance with the engine speed.

Figure 11A:
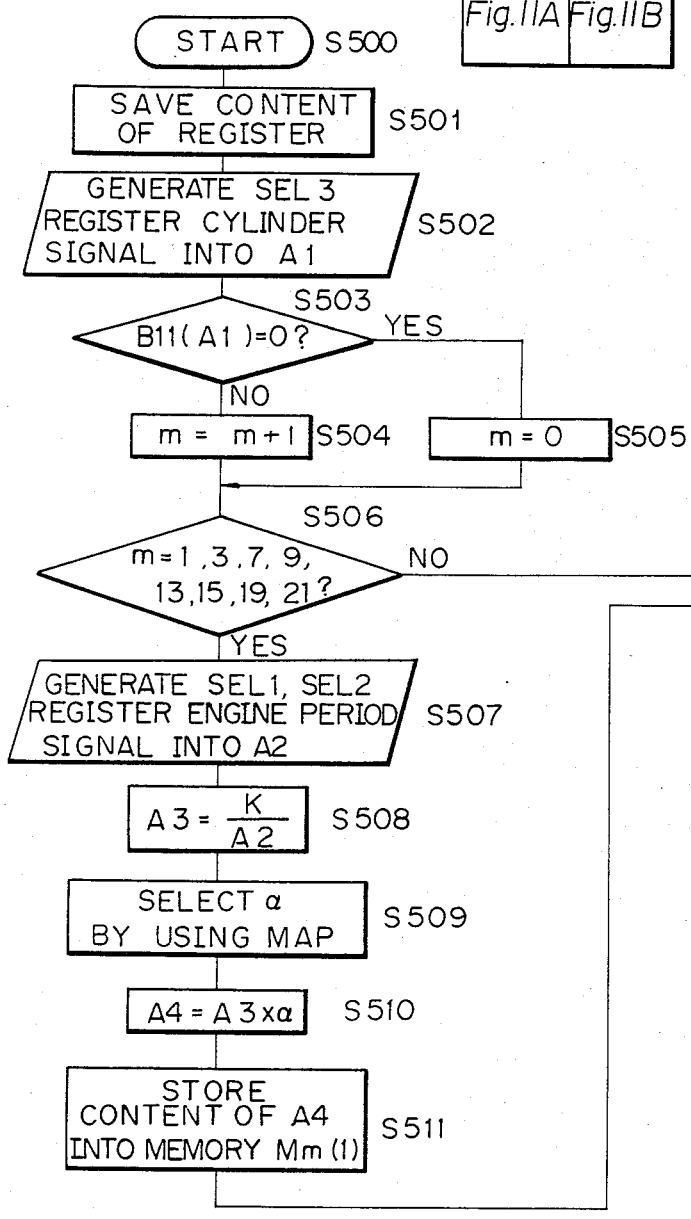

An interruption signal is supplied to the CPU 74 at the trailing edge of each rotation period signal 71a, and the engine speed change calculation program, as shown in FIG. 11, is started.

According to this calculation program, in step S501, the content of the registers are saved in a memory. In step S502, a read pulse signal SEL3 is generated, and a cylinder signal 71b appearing on a bus B is read into a register A1. In step S503, the MSB of the register A1, that is, the level of the cylinder signal 71b, is checked. If the level is "0", indicating the firing stroke start of the first cylinder, a counter memory m is cleared in step S505. However, if it is determined in step S503 that the level of the signal 71b is "1", the memory m is incremented by 1 in step S504. It is then determined in step S506 whether the content of the memory m coincides with any one of 1, 3, 7, 9, 13, 15, 19, and 21. If the result is YES in step S506, the flow advances to step S507. However, if the result is NO in step S506, the flow jumps to step S516 to end the flow sequence.

In step S507, read pulse signals SEL1 and SEL2 are generated, and engine period data T is registered into a register A2 by the counter circuit 72. In step S508, the inverse number of the content of the register A2, that is, the rotation period data T, is calculated. The inverse number is multiplied by a suitable proportional constant K to calculate the mean engine speed which is stored in a register A3.

Figure 12:
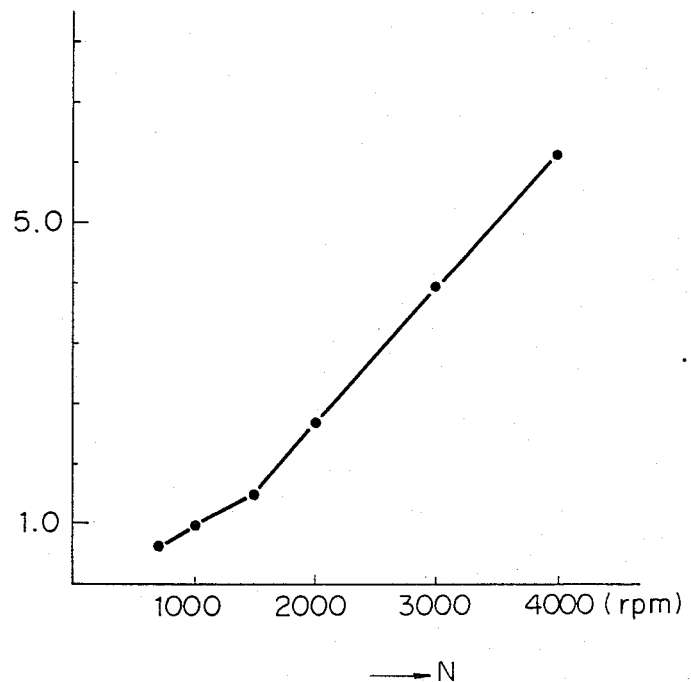
FIG. 12 is a graph showing the engine speed as a function of a correction coefficient.

FIG. 12 shows a correction coefficient $\alpha$ (plotted along the axis of the ordinate) as a function of the engine speed (rpm) (plotted along the axis of the abscissa). Correction of the detected engine speed is performed by means of this correction coefficient $\alpha$.

The method of correcting the engine speed will now be described. In step S509 in the flow chart shown in FIG. 11, the correction coefficient $\alpha$ of the engine speed which corresponds to the engine speed stored in the register A3 is selected referring to the graph shown in FIG. 12. In step S510, the engine speed stored in the register A3 is multipled by the correction efficiency $\alpha$, and the product obtained is stored in a register A4. In step S511, the content of the register A4 is stored in the memory.

Eight memories are arranged for each firing stroke in correspondence with 1, 3, 7, 9, 13, 15, 19, and 21, which values correspond to counts that the counter m assumes. More specifically, memory $M_m(1)$ is a memory which stores the mean engine speed in the first firing stroke, and memory $M_m(2)$ stores the same for the second firing stroke. In other words, the memory $M_1(2)$ stores the mean engine speed in a period wherein the crankshaft 1 rotates from 30° to 60° in the second firing stroke of the first cylinder. Memory $M_{21}(2)$ stores the means engine speed in a period wherein the crankshaft 1 rotates from 90° to 120° in the firing stroke of the second cylinder as the last cylinder in the engine speed change measurement cycle.

If it is determined in step S512 that the content of the memory m is one of 3, 9, 15, and 21, the flow goes to step S513. However, if the result is NO in step S512, the flow goes to step S516 and the flow is ended. In step S513, an engine speed variation $\Delta N'$ is calculated from the average engine speed $N_m(2)$ at a predetermined crankshaft rotational angle for a predetermined cylinder, which is calculated in steps S507 to S511 and stored in the memory $M_m(2)$, and the mean engine speed $N_m(1)$ at the same crankshaft angle for the same cylinder which is calculated in the previous calculation sequence and which is stored in the memory $M_m(1)$, in accordance with the following equation:

$$\Delta N' = (N_{m-2}(1) - N_m(1)) - (N_{m-2}(2) - N_m(2)) \tag{6}$$

where m takes the values of 3, 9, 15, and 21 for each of the first, third, fourth, and second cylinders.

The terms $(N_{m-2}(1) - N_m(1))$ and $(N_{m-2}(2) - N_m(2))$ are the engine speed changes $\Delta N$ of the respective firing strokes and correspond to the combustion condition of the engine. The change $\Delta N$ is not influenced by road conditions. In this embodiment, when the engine speed change $\Delta N$ is calculated, the mean engine speed is corrected by means of the correction coefficient $\alpha$, shown in FIG. 12. Therefore, the engine speed change $\Delta N$ is not adversely influenced by the engine speed. This means that the engine speed variation $\Delta N'$ calculated in accordance with the above equation, that is, the difference between the subsequent engine speed changes $\Delta N$ for a predetermined cylinder calculated in accordance with the pulse-like mean engine speed, is correct even in a transient time during which the engine speed fluctuates. The engine speed variation $\Delta N'$ is not influenced by road conditions and allows the precise detection of changes in combustion states in each cylinder.

Referring again to the flow chart shown in FIG. 11, in step S514, the engine speed variation $\Delta N'$ for each cylinder calculated in step S513 is supplied to the D/A converter 75. In step S515, the contents of the memory $M_m(2)$ are transferred to the memory $M_m(1)$. In step S516, the contents of the registers saved before the current interruption occurred are restored.

The engine speed change calculation program described above is started at each trailing edge of the period signal 71a, and the mean engine speed is stored in memories $M_m(1)$ to $M_m(2)$.

The mean engine speed per 30° degree rotation of the crankshaft 1 changes in a pulsed manner in accordance with the firing stroke of each cylinder.

The CPU 74 calculates, for the firing stroke of each cylinder, the mean engine speed from a crankshaft rotation angle of 30° to 60° and from 90° to 120°, as shown in FIG. 11.

Thus, the engine speed variation $\Delta N'$ for the first cylinder is calculated in accordance with the following equation:

$$\Delta N' = (N_2(1) - N_3(1)) - (N_1(2) - N_3(2)) \tag{7}$$

The output variation of the first cylinder can be determined in accordance with the engine speed variation $\Delta N'$.

In this manner, the output of an internal combustion engine can be detected in accordance with the difference between the pulse-like changes in the engine speed at predetermined times in a firing stroke, that is, engine speed changes $\Delta N$. A value corresponding to the combustion condition which is not influenced by road conditions also can be determined. Furthermore, since the determined value is corrected in accordance with the engine speed, the value having a predetermined relationship with the combustion variation can be measured under any engine speed conditions. Therefore, even if the engine conditions (engine speed) and the like change, the variation in the output of the engine can be precisely detected by calculating the difference between the differences (engine speed changes $\Delta N$) of the pulse-like engine speeds at predetermined times of subsequent firing strokes of a predetermined cylinder.

As a consequence, even in a transient state such as a load change or operation of an acceleration pedal, the measurement is corrected by the engine speed and is not adversely affected. The variation in the output of the engine can be correctly measured under actual travel conditions. In accordance with such variations in output determined in this manner, the ignition timing or the air/fuel ratio can be controlled.

Although the mean engine speed per 30° crankshaft rotation is used in the above embodiment, good correlation with the combustion condition of the internal combustion engine can be obtained if a mean engine speed for angular intervals smaller than 30° is used, according to experiments conducted by the present inventors.

In the embodiment described above, when the pulse-like engine speed change $\Delta N$ in each firing stroke of an internal combustion engine is measured, the instantaneous engine speed is corrected in accordance with a correction coefficient $\alpha$. The engine speed changes of sequential cycles are compared with each other, and the differential engine speed change is used to detect the combustion condition. However, as another embodiment of the present invention, the pulse-like change in engine speed itself can be corrected in accordance with the engine speed to provide the same effect as this embodiment. In the former embodiment, the correction coefficient $\alpha$ of the engine speed is calculated for each engine speed and calculation is performed in accordance with the calculated engine speed. However, in another embodiment, the correction coefficient $\alpha$ is calculated for two rotations of the engine, that is, for each combustion cycle.

Figure 13B:
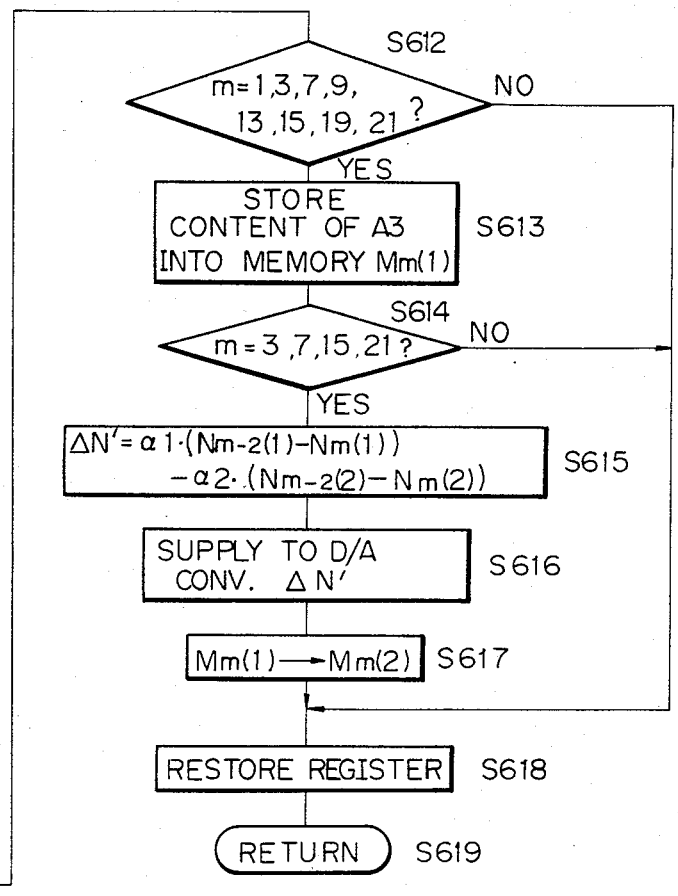

This other embodiment will now be described with reference to the flow chart shown in FIG. 13. Steps S601 and S605 to S607 are equivalent to steps S501 and S502 to S504 of the former embodiment. In steps S602 to S604, the instantaneous engine speed and an integrated value thereof are calculated and registered in registers A3 and A4, respectively. In steps S608 to S611, the mean engine speed in a register A5 and corresponding correction coefficient $\alpha 1$ ($\alpha 2$ is a value for the immediately preceding combustion cycle) are calculated. Steps S612 to S614 of FIG. 13 are the same as those of the former embodiment. In step S615, the engine speed variation $\Delta N'$ is calculated in accordance with the following equation:

$$\Delta N' = \alpha 1 \cdot (N_{m-2}(1) - N_m(1)) - \alpha 2 \cdot (N_{m-2}(2) - N_m(2)) \quad (8)$$

The above process is basically the same as that of the former embodiment. However, the respective terms representing the changes in the engine speed are multiplied by the correction coefficients $\alpha 1$ and $\alpha 2$. Steps S616 to S618 are the same as steps S514 to S516 of the former embodiment.

In the above embodiments, the pulse-like engine speed changes are sequentially compared to calculate the variations in the combustion condition. However, the present invention is not limited to these embodiments. Thus, if the engine speed change is corrected in accordance with the engine speed, the values obtained in this manner can be statistically processed to calculate a standard deviation, and the variations in the combustion condition can be calculated in accordance with this standard deviation. In this case, a similar effect is obtained.

Figure 14B:
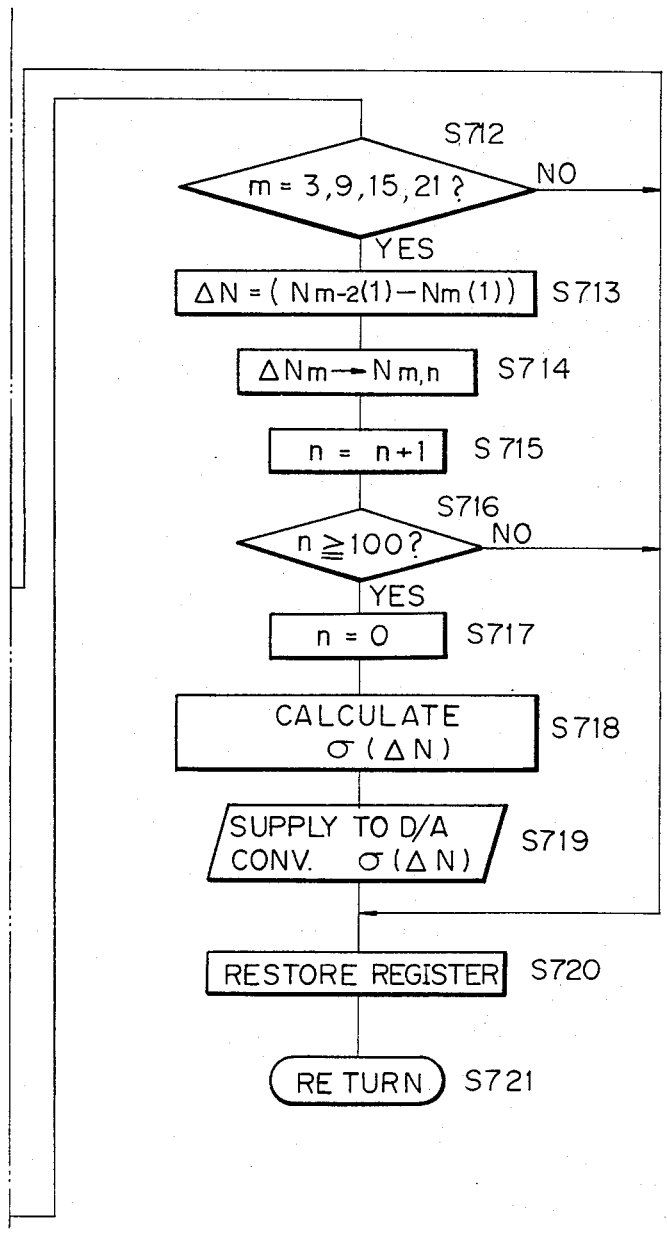

FIG. 14 shows an example of a flow chart when such statistical processing is performed. Referring to FIG. 14, steps S701 to S712 are equivalent to those of the former embodiment. In steps S713 to S719, the corrected engine speed changes are statistically processed to calculate the standard deviation $\sigma(\Delta N)$, i.e., the variation in the combustion condition is calculated. In step S713, the pulse-like engine speed changes are calculated. In step S714, pulse-like engine speed changes $\Delta N_m$ of each cylinder calculated in step S713 are stored in a memory $N_{m,n}$ for statistical processing.

In step S715, a pointer n is incremented by one. In step S716, it is determined whether the pointer n is equal to or greater than 100. If the result is NO in step S716, the flow jumps to step S720. However, if the result is YES in step S716, the pointer n is returned to 0. In step S718, statistical processing of 100 data in the memory $N_{mn}$ is performed to calculate a standard deviation $\sigma(\Delta N)$. Therefore, the standard deviation $\sigma(\Delta N)$ is obtained for each 100 engine speed changes $\Delta N_m$. In step S719, the standard deviation $\sigma(\Delta N)$ is converted into an analog signal.

A method of measuring variations in the output of an internal combustion engine according to the fourth aspect of the present invention will now be described with reference to FIGS. 15 to 20. According to this method, changes in at least one of the periodic and pulse-like engine speed, an engine torque, and an internal cylinder pressure in each firing stroke of the cylinder, are detected. In accordance with such detected changes, the difference between the sequential changes is detected.

Figure 15A:
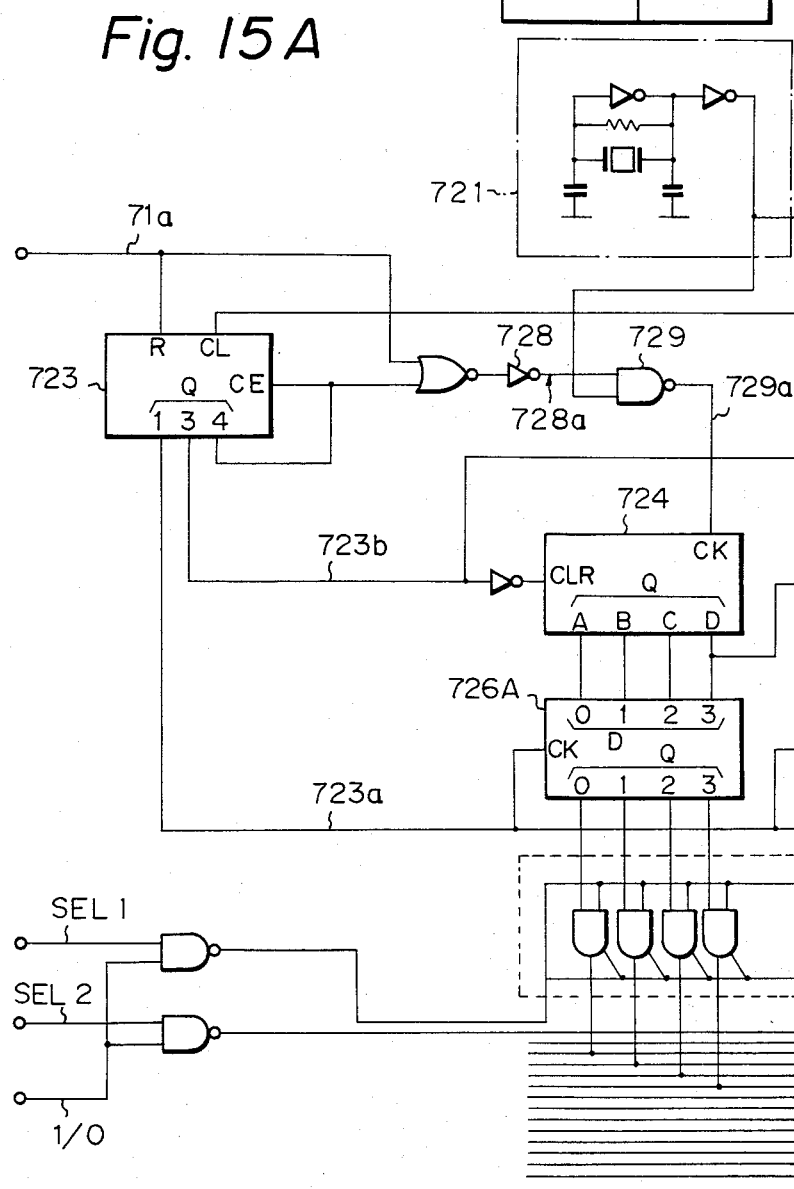
FIGS. 15A and 15B are a circuit diagram of the configuration of a counter circuit in the apparatus according to a fourth aspect of the present invention.
Figure 15B:
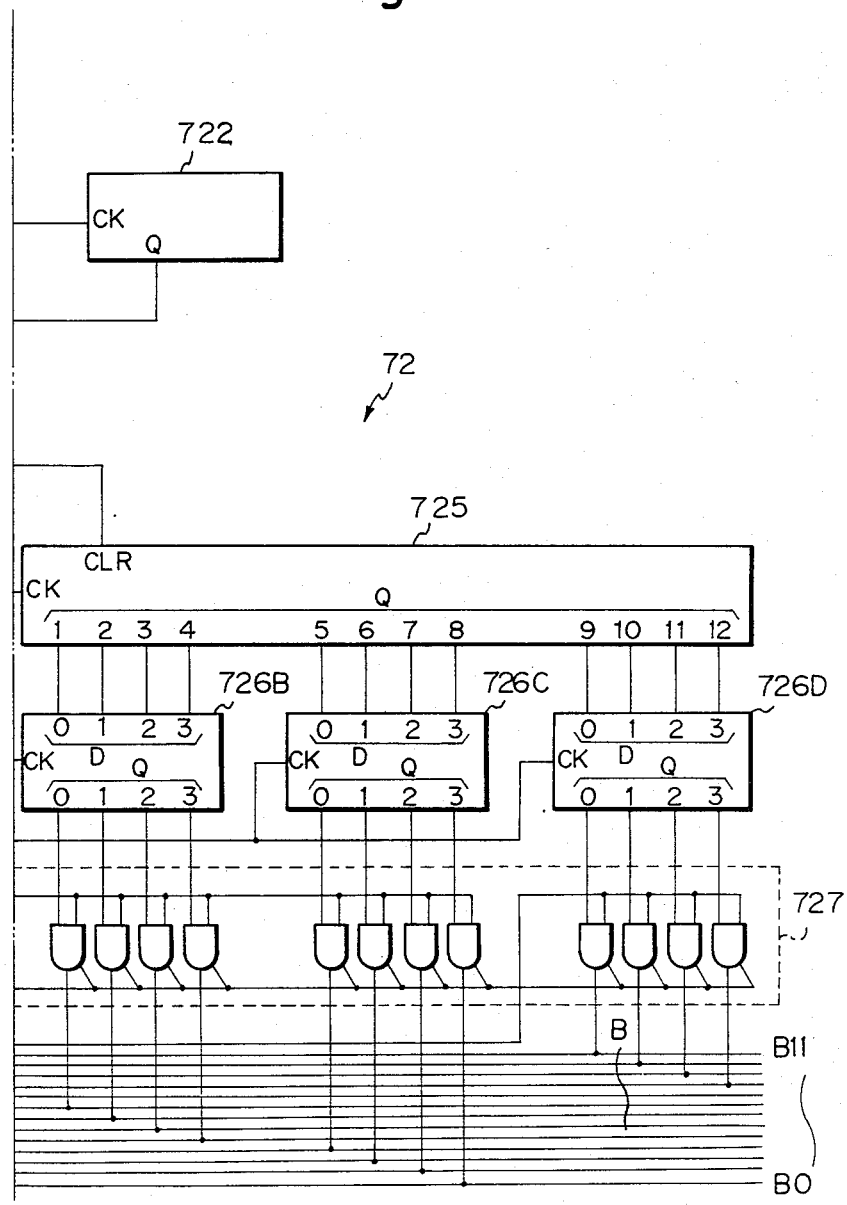

FIG. 15 shows an example of a circuit diagram of an engine speed counter circuit 72. Referring to FIG. 15, reference numeral 721 denotes an oscillator comprising a quartz oscillator; and 722, a frequency divider which frequency-divides the output from the oscillator 721 received at a terminal CK thereof and produces the frequency-divided output from a terminal Q thereof. Reference numeral 723 denotes a counter which counts the clock pulses received at a terminal CL thereof until an output terminal Q4 connected to a terminal CE goes to "1" level, if the input to a terminal R is at "0" level. During this time, other output terminals Q1 and Q3 of the counter 723 generate pulse signals.

Reference numerals 724 and 725 denote 4- and 12-bit binary counters and are series-connected to provide a 16-bit counter. In each of these counters, a terminal CK is an input terminal, a terminal CLR is an output clear terminal, and a terminal Q is an output terminal. 4-bit latches 726A, 726B, 726C, and 726D respectively latch input signals at terminals D when a timing signal is supplied to corresponding input terminals CK, thus producing latched signals from output terminals Q thereof. An interface circuit 727 with a bus B comprises a tri-state buffer 731. The bus B consists of lines B0 to B11 for transmitting a 12-bit signal.

Figure 16:
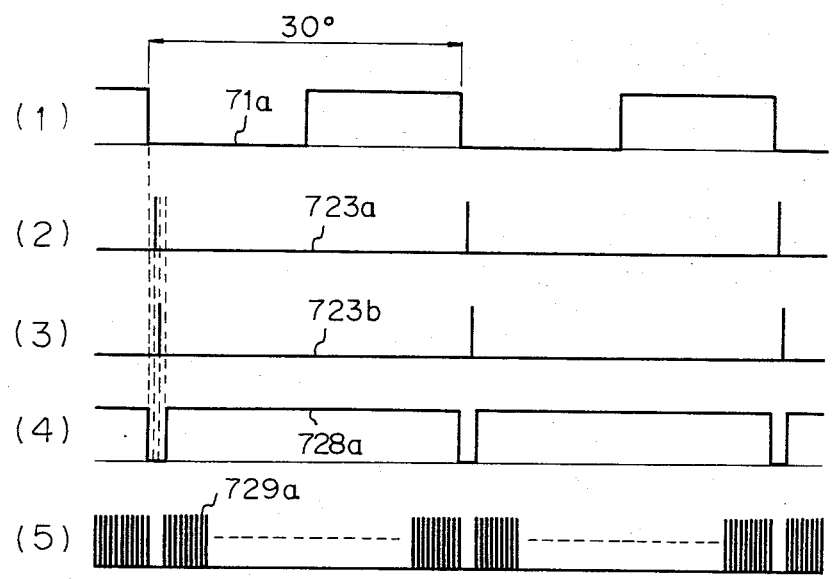
FIGS. 16(1) to 16(5) are charts showing the signal waveforms in the counter circuit shown in FIG. 15.

The operation of the counter circuit 72 will now be described with reference to the timing chart shown in FIG. 16. An output pulse signal produced from the angle signal sensor 4 and shaped by the waveform shaper 71A, i.e., a rotation period signal 71a (FIG. 16,(1)) for 30° rotation of the crankshaft 1, is supplied to the terminal R of the counter 723. While the period signal 71a is at "0" level, the counter 723 counts until the output terminal Q4 counts up. The counter 723 produces pulse signals 723a (FIG. 16,(2)) and 723b (FIG. 16,(3)) from the output terminals Q1 and Q3, respectively. An output signal 728a from an inverter 728 corresponding to this timing is shown in FIG. 16,(4). When the signal 728a is at "1" level, a NAND gate 729 is opened, and the output pulses from the frequency divider 722 are supplied to the terminal CK of the counter 724. 16-bit binary data T proportional to the 30° rotational period of the crankshaft 1 are supplied to the teminals Q of the counters 724 and 725. An output signal 729a of the NAND gate 729 is shown in FIG. 16,(5).

The rotation period data T of the counters 724 and 725 is stored in the data latches 726A to 726D at the timing of the signal 723a, and are produced from their terminals Q. The output signals from the counters 724 and 725 are reset at the timing of a signal 723b.

The rotation period data in the data latches 726A to 726D are fetched in the CPU 74 through the interface circuit 727 via the bus B twice in units of 12 bits and 4 bits at the timings of the read pulse signal SEL1 or SEL2 and I/O from the CPU 74.

Figure 17:
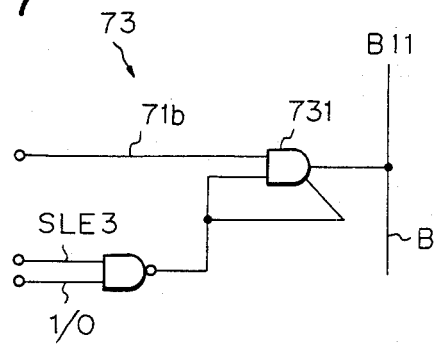
FIG. 17 is a circuit diagram of the configuration of a reading circuit in the apparatus according to the fourth aspect of the present invention.

FIG. 17 shows an example of the circuit diagram of the reading circuit 73. The cylinder signal 71b shaped by the waveform shaper 71B is fetched into the CPU 74 through the tri-state buffer 731 via the bus B at the timings of the read pulse signal SEL3 and I/O from the CPU 74.

The flow sequence of the CPU 74 for calculating the engine speed variations will be described with reference to FIG. 18.

Figure 18B:
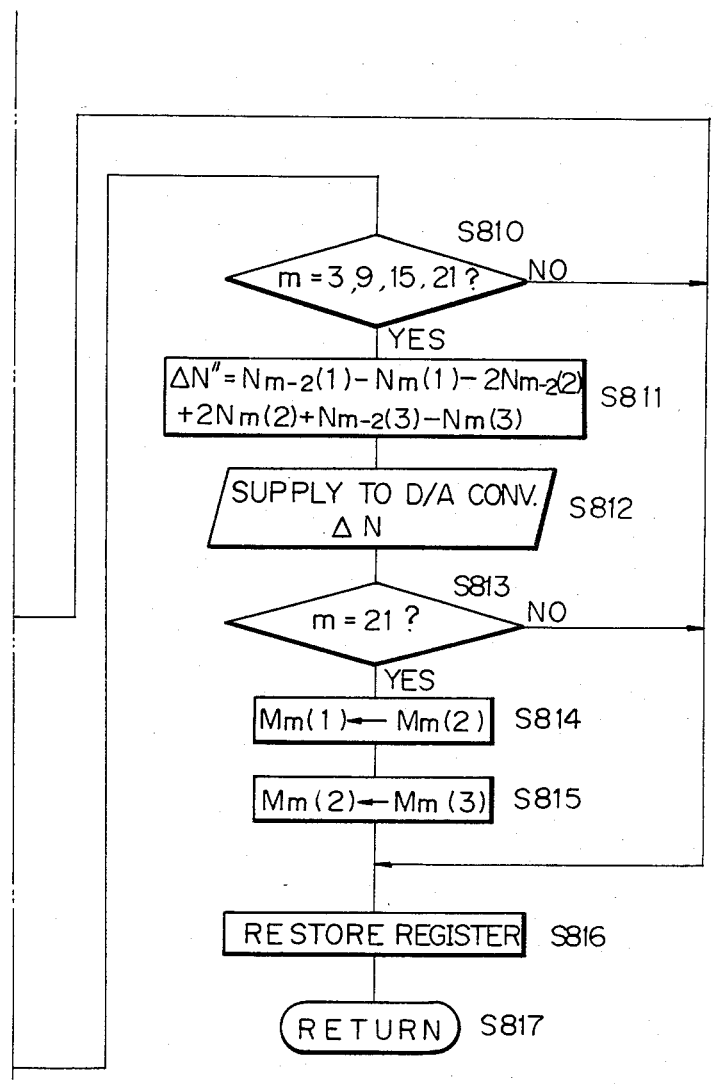

An interruption signal is supplied to the CPU 74 at each trailing edge of the rotation period signal, and the engine speed variation calculation program, as shown in FIG. 18, is started.

According to this program in step S801, the contents of the registers before the interruption are saved in a memory. In step S802, the read pulse SEL3 is generated to register the cylinder signal 71b appearing on the bus B into a register A1. In step S803, the level of the MSB of the register A1, i.e., the cylinder signal 71b, is determined. If the level is detected to be "0" which indicates the firing stroke start of the first cylinder, a counter memory m is cleared in step S805. However, if it is determined in step S803 that the detected level is "1", the memory m is incremented by one in step S804. In step S806, it is determined whether the content of the memory m coincides with any one of 1, 3, 7, 9, 13, 15, 19, and 21. If the result is YES in step S806, the flow goes to step S807 and subsequent steps. However, if the result is NO in step S807, the flow jumps to step S816 and the flow ends.

In step S807, the read pulse signal SEL1 or SEL2 is generated and the rotation period data T is fetched in a register A2 from the counter circuit 72. In step S808, the inverse number of the rotation period data T or the content of the register A2 is calculated. The inverse number is multipled by a suitable proportionality constant K to calculate the mean engine speed which is stored in a register A3.

In step S809, the content of the register A3 is stored in a memory for storing the mean engine speed. Eight such memories are prepared for one firing stroke in correspondence with the respective counts of the memory m, that is, 1, 3, 7, 9, 13, 15, 19, and 21. Memory $M_m(1)$ stores the mean engine speed in the firing stroke of the first cylinder. Memories $M_m(2)$ and $M_m(3)$ store the same for the second and third firing strokes, respectively. Thus, memory $M_1(2)$ stores the mean engine speed from a crankshaft rotation angle of 30° to 60° in the second firing stroke of the first cylinder, and memory $M_{21}(2)$ stores the mean engine speed from a crankshaft rotation angle of 90° and 120° in the firing stroke of the second cylinder, as the last cylinder of the engine speed variation measurement cycle.

If it is determined in step S810 that the content of the memory m coincides with any one of 3, 9, 15, and 21, the flow goes to step S811. However, if the result is NO in step S810, the flow jumps to step S816 and the processing is completed. In step S811, the engine speed variation difference $\Delta N''$ of a predetermined cylinder is calculated in accordance with the mean engine speed $N_m(3)$ at a predetermined crankshaft rotational angle for a predetermined cylinder in the third firing stroke, which is calculated in steps S807, S808, and S809 and which is stored in the memory $M_m(3)$, and also in accordance with the mean engine speeds $N_m(2)$ and $N_m(1)$ at a predetermined crankshaft rotational angle for a predetermined cylinder, which are calculated in the immediately preceding and the next to immediately preceding measurement cycles as the second and first firing strokes and which are stored in the memories $N_m(2)$ and $N_m(1)$. This calculation is performed in accordance with the following equation:

$$\Delta N'' = \{(N_{m-2}(1) - N_m(1)) - (N_{m-2}(2) - N_m(2))\} \\ - \{(N_{m-2}(2) - N_m(2)) - (N_{m-2}(3) - N_m(3))\} \quad (9)$$

wherein m can take values of 3, 9, 15, and 21 for the first, third, fourth, and second cylinders.

In the above equation (9), the terms $(N_{m-2}(1) - N_m(1))$, $(N_{m-2}(2) - N_m(2))$ and $(N_{m-2}(3) - N_m(3))$ can take values which correspond to the combustion condition of the internal combustion engine and which are not influenced by road conditions.

According to the above equation (9), the calculation is performed as:

$$(N_{m-2}(1) - N_m(1)) - (N_{m-2}(2) - N_m(2))$$

or $$(N_{m-2}(2) - N_m(2)) - (N_{m-2}(3) - N_m(3))$$

thereby detecting the variations in the combustion condition of each predetermined cylinder.

Since the calculation is performed in accordance with the terms $(N_{m-2}(1) - N_m(1))$, $(N_{m-2}(2) - N_m(2))$ and $(N_{m-2}(3) - N_m(3))$, the calculated values correspond to the combustion conditions. However, this relationship is different depending on the engine speed involved. In a transient state of an internal combustion engine, depending upon the engine speed involved, it is difficult to precisely detect the variation in the combustion condition even if the calculation is performed according to:

$$(N_{m-2}(1) - N_m(1)) - (N_{m-2}(2) - N_m(1))$$

or $$(N_{m-2}(2) - N_m(2)) - (N_{m-2}(3) - N_m(3)).$$

However, in accordance with the above equation (9), the correction of an error in a transient state due to a change in the engine speed is corrected by calculating thus:

$$\{(N_{m-2}(1) - N_m(1)) - (N_{m-2}(2) - N_m(2))\} - \{(N_{m-2}(2) - N_m(2)) - (N_{m-2}(3) - N_m(3))\}.$$

In the flow chart shown in FIG. 18, in step S802, the engine speed variation difference $\Delta N''$ for each cylinder calculated in step S811 is supplied to the D/A converter 75. In step S813, the content of the memory m is checked. If the content of the memory m is detected to be 21, the flow advances to step S814. However, if not, the flow jumps to step S816, and the flow ends. In step S814, the content of the memory $M_m(2)$ is transferred to the memory $M_m(1)$. In step S815, the content of the memory $M_m(3)$ is transferred to the memory $M_m(2)$. In step S816, the contents of the registers which were saved at the beginning of the program are restored.

The engine speed variation calculation program is started at each trailing edge of the period signal 71a, and the mean engine speed is stored in the memories $M_m(1)$, $M_m(2)$, and $M_m(3)$.

The mean engine speed per 30° rotation of the crankshaft 1 periodically pulsates, as indicated by the dotted line, in accordance with the firing stroke of each cylinder. The CPU 74 calculates the mean engine speed from the crankshaft rotational angle of 30° to 60° and from 90° to 120° for the firing stroke of each cylinder.

The engine speed variation difference $\Delta N''$ of the first cylinder is calculated in accordance with the following equation:

$$\Delta N'' = \{N_1(1) - N_3(1) - N_1(2) - N_3(2))\} - \{(N_1(2) - N_3(2) - (N_1(3) - N_3(3))\} \quad (10)$$

The error which is caused due to the engine speed change in a transient state is corrected in accordance with the engine speed variation difference $\Delta N''$ and the variation in the output of the first cylinder therefore can be measured correctly.

In the embodiment described above, the mean engine speed for each rotation through 30° of the crankshaft was used. However, the correlation between the mean engine speed and the combustion state of the engine is further improved if the mean engine speed is detected at intervals shorter than 30°. An example of this method will now be described with reference to FIG. 19.

Figures 19, 20:
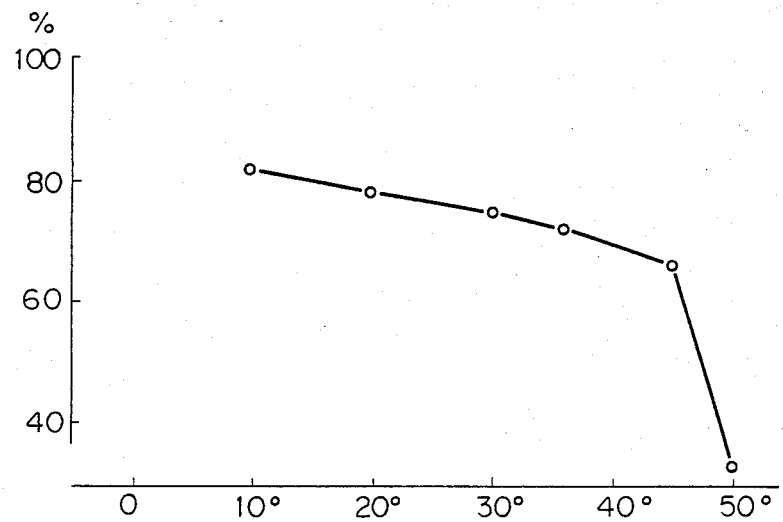
FIG. 19 is a graph explaining the mean effective pressure as a function of the sampling interval of the engine speed.
FIG. 20 is a table showing the correlation between the sampling positions of the engine speed and the mean effective pressure.

Referring to FIG. 19, the engine speed sampling interval is plotted along the axis of the abscissa, while the correlation coefficient (%) with the mean effective pressure Pi is plotted along the axis of the ordinate. Both values plotted on the axes have a high correlation. In FIG. 19, data at respective angular intervals from 10° to 50° are shown. However, if the pulse-like changes in engine speed in the firing stroke are sampled, and the sampling interval is short, the correlation with the mean effective pressure Pi is improved. However, if the sampling interval exceeds 50°, processing within the firing stroke becomes physically impossible. Therefore, the mean engine speed must be calculated at a sampling interval of 45° or less.

FIG. 20 is a table showing two sampling positions POS1 and POS2 for calculating the engine speed change and the correlation coefficient with the mean effective pressure Pi at these positions, when the sampling interval is 10°. The sampling position POS1 corresponds to the sampling position of between 30° to 60° for the first cylinder. The sampling position POS2 corresponds to the sampling position between 90° and 120°. The correlation coefficient (%) is indicated at the intersection of both sampling positions POS1 and POS2.

Referring to FIG. 20, when the pulse-like changes in engine speed appearing in the firing stroke are used, there are optimal engine speeds which may be used. When the sampling position POS1 is 10° to 20° and the sampling position POS2 is 40° to 50° or 50° to 60°, a rising engine speed is preferably used to provide an optimal effect. Furthermore, when the correlation coefficient of 60% or more with the mean effective pressure Pi is required, the sampling position POS1 must be 10° before top dead center and 40° thereafter, and the sampling position POS2 must be 20° to 90° after top dead center.

We claim:

1. A method for measuring variations in output of an internal combustion engine, comprising the steps of: obtaining at least one of signals representing engine rotational speed, engine torque, and an internal cylinder pressure during firing strokes of the internal combustion engine; detecting periodical and pulsating changes in the obtained signal; and calculating a differential value of the change in the obtained signal at the portion where the gradient of the change is maximum.

2. A method according to claim 1, wherein the signal is obtained at a predetermined angle or time and the differential value is calculated from a difference between the signals obtained consecutively.

3. A method according to claim 2, wherein the predetermined angle or time is determined in such a manner that the signals are obtained at an angle of 30° CA or less.

4. A method according to claim 1, wherein the differential value is integrated over a predetermined period of time or for a predetermined number of times, the integrated differential value is statistically processed to calculate a standard deviation, and the standard deviation corresponds to a combustion state of the engine.

5. A method according to claim 1, wherein a value obtained by sequentially comparing the differential values in consecutive firing strokes for a predetermined cycle corresponds to a variation in a combustion state of the engine.

6. A method for measuring variations in output of an internal combustion engine, comprising the steps of obtaining at least one of signals representing engine rotational speed, engine torque and internal cylinder pressure during firing strokes of the internal combustion engine; detecting periodical and pulsating changes in the obtained signal; and calculating a difference between maximum and minimum values of the change in the obtained signal, whereby the calculated difference is treated as a value corresponding to the state of combustion in the engine.

7. A method according to claim 6, wherein the difference between the maximum and minimum values is a detection value for consecutive firing strokes for a predetermined cylinder, and a value obtained by sequentially comparing the detection values is used as a value corresponding to the variation in the combustion in the engine.

8. A method according to claim 6, wherein the difference between the maximum and minimum value is integrated for a predetermined period of time or for a predetermined number of times, the integrated difference is statistically processed to calculate a value indicating a degree of discreteness, that is, a standard deviation, and the value indicating the degree of discreteness is used as a value corresponding to the variation in the combustion in the engine.

9. A method for measuring variations in output of an internal combustion engine, comprising a step of detecting a value corresponding to the state of combustion of the engine by detecting periodical and pulsating changes in at least one of signals representing engine rotational speed, engine torque, and internal cylinder pressure during firing strokes of the internal combustion engine, wherein the detected value is a value corrected by the engine rotational speed.

10. A method according to claim 9, wherein the detected values corrected by the engine rotational speed are the values detected in consecutive firing strokes of a predetermined cylinder, and a value calculated by sequentially comparing the detected values is used as a value corresponding to the variation in the combustion in the engine.

11. A method according to claim 9, wherein a correction coefficient is calculated for a mean engine rotational speed per each combustion cycle of the engine, and a correction is carried out by the calculated correction coefficient.

12. A method according to claim 9, wherein the detected values corrected in accordance with the engine speed are accumulated for a predetermined period of time or for a predetermined number of values, the accumulated values are statistically processed to calculate a standard deviation, and the calculated standard deviation is used as a value corresponding to a variation in the combusion in the engine.

13. A method for measuring variations in output of an internal combustion engine, comprising the steps of detecting periodical and pulsating changes in at least one of signals representing engine rotational speed, engine torque, and internal cylinder pressure during firing strokes of the internal combustion engine, calculating difference of changes in at least one of the engine rotational speed, the engine torque and internal cylinder pressure within predetermined periods of consecutive firing strokes of a predetermined cylinder, and calculating difference of the calculated consecutive difference of changes by using the calculated difference of changes.

14. A method according to claim 13, wherein a mean engine rotational speed at angular intervals of 45° or less of a crankshaft is used as at least one of signals representing engine rotational speed, engine torque, and the internal cylinder pressure during firing strokes of the engine.

* * * * *